United States Patent
Hasan et al.

(10) Patent No.: US 7,653,670 B2
(45) Date of Patent: Jan. 26, 2010

(54) STORAGE-EFFICIENT AND COLLISION-FREE HASH-BASED PACKET PROCESSING ARCHITECTURE AND METHOD

(75) Inventors: Jahangir Hasan, Plainsboro, NJ (US);
Srihari Cadambi, Cherry Hill, NJ (US);
Srimat T. Chakradhar, Manalapan, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 399 days.

(21) Appl. No.: 11/564,252

(22) Filed: Nov. 28, 2006

(65) Prior Publication Data

US 2007/0136331 A1     Jun. 14, 2007

Related U.S. Application Data

(60) Provisional application No. 60/740,114, filed on Nov. 28, 2005.

(51) Int. Cl.
*G06F 12/00*     (2006.01)
(52) U.S. Cl. .................................................... 707/205
(58) Field of Classification Search .................. 707/205
See application file for complete search history.

(56) References Cited

U.S. PATENT DOCUMENTS 5,920,900 A * 7/1999 Poole et al. ................. 711/216
6,393,545 B1 * 5/2002 Long et al. .................... 712/34
6,707,463 B1 * 3/2004 Gibson et al. ................ 345/619
7,149,216 B1 * 12/2006 Cheriton ...................... 370/392
2001/0043614 A1 * 11/2001 Viswanadham et al. ..... 370/469
2003/0105976 A1 * 6/2003 Copeland, III ............... 713/201
2003/0174718 A1 * 9/2003 Sampath et al. ............. 370/401
2005/0063382 A1 * 3/2005 Fenner ....................... 370/389
2005/0074004 A1 * 4/2005 Wu ............................ 370/389
2005/0174272 A1 * 8/2005 Cadambi et al. ............ 341/106
2005/0187898 A1 * 8/2005 Chazelle et al. ................ 707/1

OTHER PUBLICATIONS

Hayoyu Song, Sarang Dharmapurikar, Jonathan Turner, John Lockwood, Fast Hash Table Lookup Using Extended Bloom Filter: An Aid to Network Processing, Washington University in Saint Louis, Sain Louis, MO 63130, USA, SIGCOMM'05, Aug. 21-26, 2005.*

* cited by examiner

*Primary Examiner*—John R. Cottingham
*Assistant Examiner*—Mohammed R Uddin
(74) *Attorney, Agent, or Firm*—Jeffrey J. Brosemer

(57) ABSTRACT

An architecture and method for data storage and retrieval which also addresses a number of key problems associated with systems employing hash-based techniques. The architecture and method employs a collision-free hashing scheme called Bloomier filter while eliminates its false positives in a storage efficient way. Wildcard support is added through the use of a scheme called prefix collapsing, while introducing only a small additional storage requirement and reduced hardware complexity. Real update traces indicate that both fast and incremental updates are provided—features generally not available in prior-art collision-free hashing schemes.

1 Claim, 21 Drawing Sheets withdraw(p, l)
(low, high) = stride interval in which I lies
pc = prefixCollapse(p, low)
I = Index Table output for lookup of pc
if (FilterTable[I] == pc)
    /* collapsed prefix exists */
    {P} = expand(p, high)
    B = BitvectorTable[I]
    for each prefix p' in {P}
        bv_idx = p' >> low /* index into bit-vector */
        if (B[bv_idx] == 1)
            /* prefix exists */
            op = original length of prefix for B[bv_idx]
            if (op == l)
                p''' = next largest prefix in sub-tree
                of pc expanded to high
                ptr = result table pointer of I, bv_idx
                if (p''' exists)
                      Result Table[ptr] = next hop of p'''
                else
                      Result Table[ptr] = ∅
                B[bv_idx] = 0 if (B == 0)
    /* all expanded prefixes of pc deleted */
    remove pc from Index Table

*FIG. 7A*

```
announce(p, l, h)
    (low, high) = stride interval in which I lies
    pc = prefixCollapse(p, low)
    I = Index Table output for lookup of pc
    if (FilterTable[I] == pc)
        /* collapsed prefix already exists */
        {P} = expand(p, high)
        B = BitvectorTable[I]
        for each prefix p' in {P}
            bv_idx = p' >> low /* index into bit-vector */
            if (B[bv_idx] == 1)
                /* prefix exists: modify Result Table only */
                op = original length of prefix for B[bv_idx]
                if (op <= l)
                    ptr = result table pointer of I, bv_idx
                    ResultTable[ptr] = h
            else
                /* prefix does not exist: modify bitvector */
                B[bv_idx] = 1
                realloc bitvector's region in Result Table if required
                set Result Table entry
    else
        /* collapsed and expanded prefixes must be newly added
        */
        IndexTableAdd(pc)
        announce(p, l, h)
```

FIG. 7B

STORAGE-EFFICIENT AND COLLISION-FREE HASH-BASED PACKET PROCESSING ARCHITECTURE AND METHOD

CROSS REFERENCE TO RELATED APPLICATIONS

This invention claims the benefit of U.S. Provisional Patent Application No. 60/740,114 filed Nov. 28, 2005 the entire contents of which are incorporated by reference

FIELD OF THE INVENTION

This invention relates generally to the field of information storage and retrieval and in particular it relates to an efficient, fast, and deterministic storage and retrieval method and architecture.

BACKGROUND OF THE INVENTION

The exploding number of applications with high bandwidth requirements—such as video conferencing and on-demand video—is resulting in a steep growth in internet traffic. This explosive growth in traffic volume is compounded by the fact that the number of internet hosts is also growing dramatically. As can be appreciated, widespread deployment of next generation transmission facilities—such as the OC768 standard of 40 Gbps—will translate into better end-to-end performance only if the performance of devices such as network routers improves along with necessary increases in routing table sizes, line rates, and the volume of per-packet processing.

Longest Prefix Matching (LPM) is a technique that has become a fundamental part of IP-lookup, packet classification, intrusion detection and other packet-processing tasks that are performed by a router. As is known, a prefix is a binary string of a particular length followed by a number of wildcard bits. IP-lookup amounts to finding the longest matching prefix among all prefixes in a routing table. Packet classification involves finding the best matching rule for a packet among a set of rules. Because each rule has multiple fields, packet classification is essentially a multiple-field extension of IP-lookup and can be performed by combining building blocks of LPM for each field (See, for example, V. Srinivasan, G. Varghese, S. Suri and M. Waldvogel, "Fast and Scalable Layer-4 Switching", In *Proceedings of ACM SIGCOMM* 1998).

Presently, there exist three major techniques for performing LPM, namely: Ternary Content Addressable Memories (TCAM), trie-based schemes, and hash-based schemes. Ternary Content Addressable Memories are custom, non-commodity devices that simultaneously compare an incoming query with every prefix stored in memory. Due to their custom, non-commodity nature and "brute-force" searching method, the cost and/or power dissipation of TCAMs is prohibitive for large tables and high line rates.

Trie-based schemes use a tree-like data structure to match a query, successively a few bits at a time, against prefixes in a table. Due to the method of matching, the lookup latency depends on the length of the prefixes. For long prefixes, such as those used with IPv6, the worst case lookup latency becomes considerably long—leading to design complications (e.g., larger buffers, deep and complex pipelines) with high bandwidth networks. Furthermore, a trie-based scheme requires a space to hold pointers from nodes to their children, resulting in large memory usage. Even in state-of-the-art trie schemes like Tree Bitmap (See, e.g., Will Eatherton, George Varghese and Zubin Dittia, Tree Bitmap: Hardware/Software Ip Lookups with Incremental Updates", *ACM SIGCOMM Computer Communication Review* 34(2), 2004.) the necessary data structure is quite large, requiring that the trie be stored off-chip. Such off-chip designs are undesirable for a number of reasons including long latency, poor performance, high power and design complexity.

Hash-based schemes however, do not perform brute-force searches like TCAMs and consequently they may potentially require an order-of-magnitude lower power. In addition—and quite unlike tries—hash-based schemes employ a flat data-structure, thereby permitting smaller memory sizes which are amenable to on-chip storage, and key-length-independent O(1) latencies.

Inasmuch as a transition to IPv6 may well preclude tries and TCAMs as LPM solutions for high line rates and large tables, an efficient hash-based scheme may offer promise. Regardless of future transition however, a superior hash-based scheme may be an invaluable asset to present day routers as well.

Despite such promise however, there are at least two significant problems that obstruct the practical deployment of any hash-based scheme for LPM. First, hash tables inherently have collisions and necessarily use techniques like chaining to deal with them. As a result, lookup rates for hash tables are unpredictable and sensitive to the set of prefixes in the table. Since systems which employ hash-schemes i.e., routers, oftentimes must guarantee the worst-case lookup rate as dictated by the line-rate, such unpredictability is quite undesirable.

Unfortunately, improving the probability of collisions (See, e.g. Haoyu Song, Sarang Dharmapurikar, J. Turner and J. Lockwood, "Fast Hash Table Lookup Using Extended Bloom Filter: An Aid to Network Processing,", *Proceedings of the Annual ACM SIGCCOMM* 2005) does not guarantee a worst-case lookup rate as demanded by a line-rate, and consequently a router employing such an improved scheme is vulnerable to denial of service attacks (See, e.g., V. P. Kumar, T. V. Lakshman and D. Stiliadis, "Beyond Best Effort: Router Architectures for the Differentiated Services of Tomorrow's Internet", *IEEE Communications Magazine, May* 1998). Furthermore, even infrequent collisions produce variable lookup latencies thereby requiring complicated queueing and stalling mechanisms in the router pipeline. Finally, in order to reduce the probability of collisions large tables are required which necessitate off-chip storage for most of the data structure thereby compounding the power dissipation and off-chip bandwidth problems previously described.

The second problem associated with hash-based schemes for LPM results from the fact that with LPM the keys being searched are fully specified y-bit values whereas the prefixes originally inserted have shorter length x (x<y) and end in y-x wildcard bits. Because hash functions cannot operate on wildcard bits, and assuming a specific bit-value for the wildcard bits may cause erroneous search results, a separate hash table is required for each prefix length x. Consequently then a search looks up multiple tables, and picks the longest matching prefix.

For both on-chip and off-chip implementation of the tables, each additional hash table requires more memory banks or ports, pins for bandwidth (if off-chip), power, wiring, and arbitration logic. And while IPv4 would require as many as 32 hash tables—IPv6 would require up to 128 tables !

One approach for reducing the number of unique prefix lengths is known as controlled prefix expansion (CPE) (See, e.g., V. Srinivasan and G. Vargese, "Faster IP Lookups Using Controlled Prefix Expansion", *AC<SIGMETRICS Joint International Conference on Measurement and Modeling of Computer Systems,* 1998). Controlled Prefix Expansion converts a prefix of length x into a number of prefixes of longer length x+l, where (l≧1) by expanding l of its wildcard bits into their $2^l$ possibilities. In so doing, CPE inflates the number of prefixes by a $2^{average\ expansion\ length}$-factor adversely affecting storage space. The fewer the unique prefix lengths desired, the larger is the explosion. The result is that for a routing table of 100K prefixes, a system based on average-case design may actually have to accommodate 500K prefixes, whereas a worst-case design may be impossible to implement.

SUMMARY OF THE INVENTION

The above problems are solved and an advance is made in the art according to the principles of the present invention directed to a hash-based packet processing architecture and method that is both collision-fee and storage-efficient.

And while our inventive architecture and method is applicable to a variety of storage and retrieval problems, we have described in detail its application to a particular type of storage and retrieval problem—namely those involving Longest Prefix Matching schemes. Accordingly, this embodiment of the present invention is known to us as a Collision-free Hashing-Scheme for LPM (Chisel). In sharp contrast to prior-art approaches, the present invention is directed to a novel architecture which successfully addresses—for the first time—both of the key problems associated with hash-based LPM while being amenable to single chip implementation.

According to an aspect of the present invention, deterministic lookup rates are guaranteed through the use of a collision-free hashing scheme while providing dynamic key updates and exhibiting relative immunity from false positives that plagued the art.

More particularly, key characteristics found in real update traces are exploited thereby enabling fast, incremental updates. Viewed from this perspective, the present invention provides incremental updates in a collision-free hashing-scheme—a characteristic unknown in the art.

Additionally, a two-level data structure using pointer indirection is employed, thereby eliminating false positives while requiring substantially less storage than prior-art naive approaches, for IPv4 and IPv6, respectively. Viewed from this perspective, the present invention eliminates false positives in a superior, storage-efficient manner.

Finally, a prefix-collapsing technique is developed and employed to both support wildcard bits and overcome infirmities of prior-art hash-based schemes namely, a prohibitively large number of tables and/or an explosion in the number of prefixes due to CPE. Advantageously, the present invention reduces the number of unique prefix lengths without the attendant explosion in the number of prefixes. Viewed from this additional perspective, the present invention provides support for wildcard bits with a small number of tables while maintaining efficient storage size.

DESCRIPTION OF THE DRAWING

Further features, aspects, and advantages of the present invention may be understood with reference to the accompanying drawing in which:

FIG. 7(A) is a pseudocode listing for a withdraw update procedure according to the present invention;

FIG. 7(B) is a pseudocode listing for an announce update procedure according to the present invention;

DETAILED DESCRIPTION

Figure 1A:
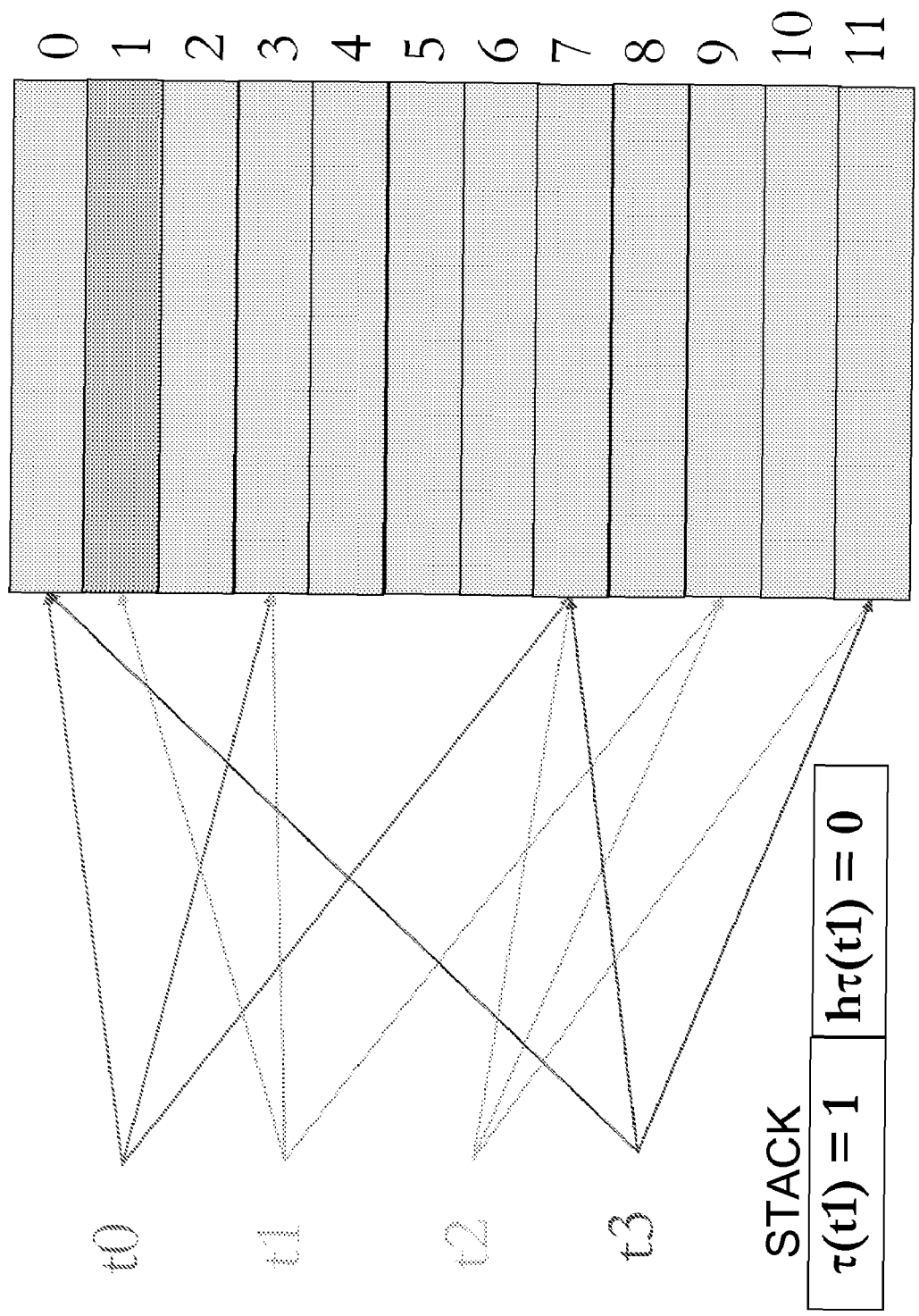
FIG. 1A-FIG. 1D is an Example illustrating the setup algorithm for finding τ(t) for all t and the ordering Γ.
Figure 1B:
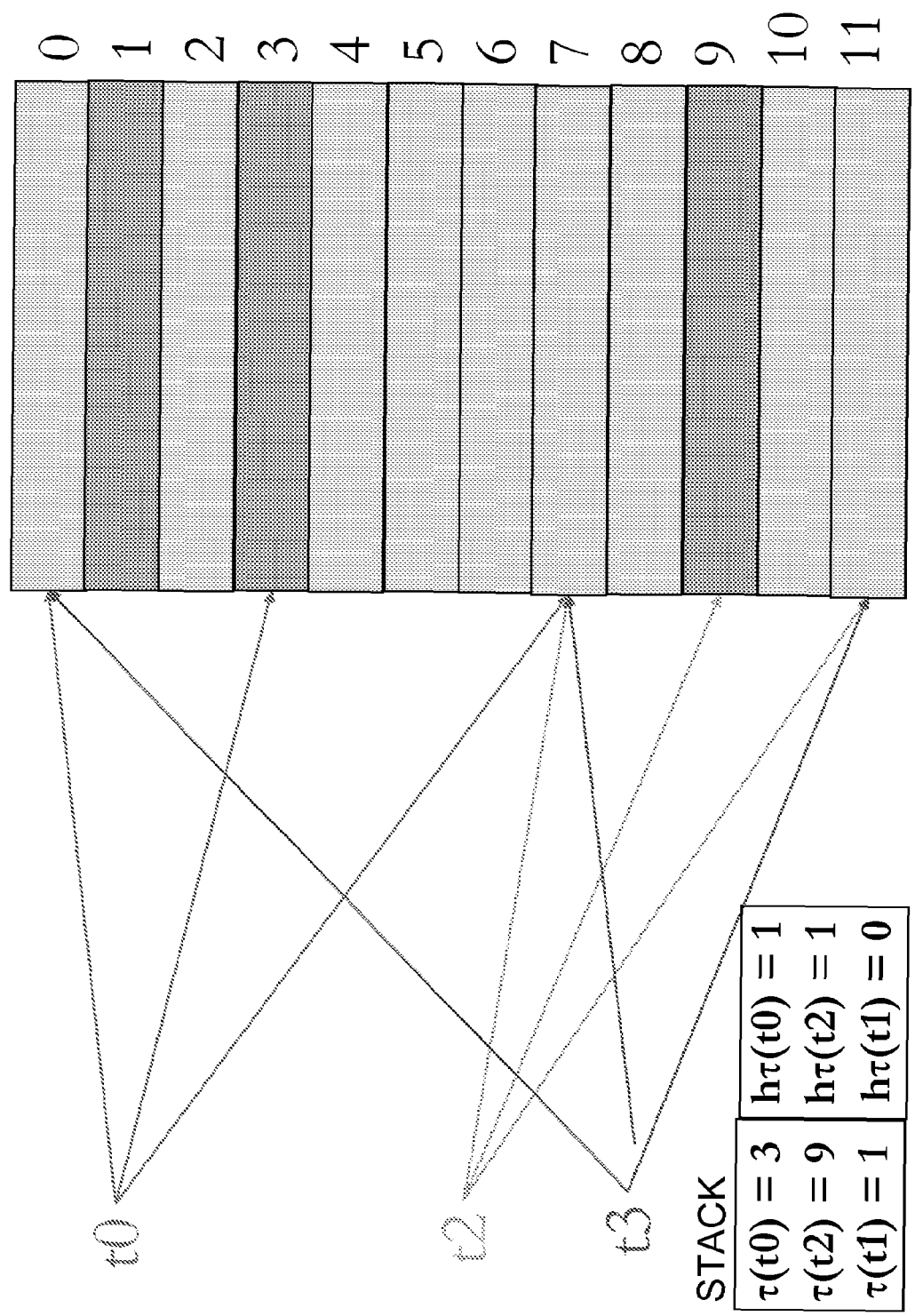
Figure 1C:
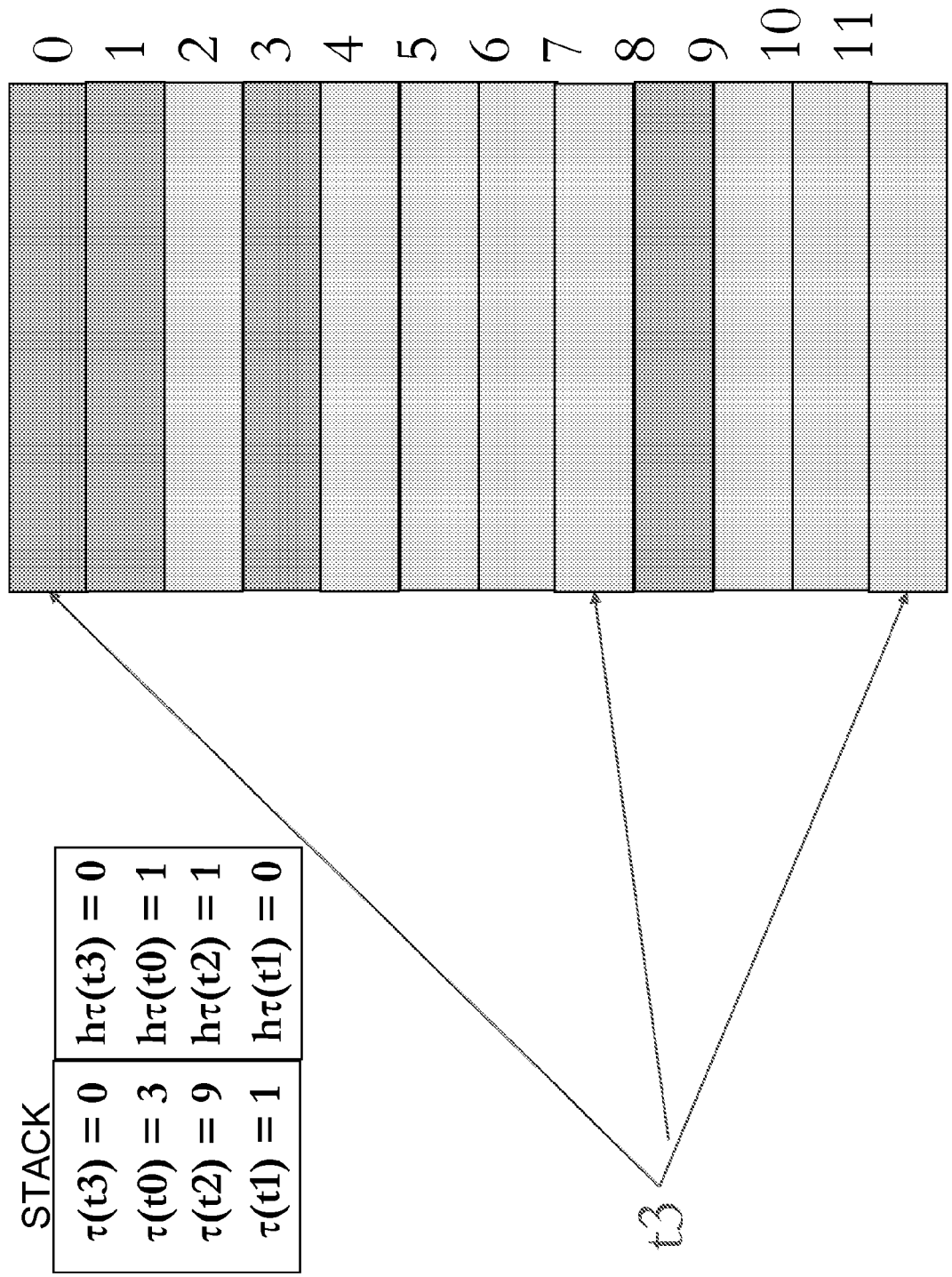

The following merely illustrates the principles of the invention. It will thus be appreciated that those skilled in the art will be able to devise various arrangements which, although not explicitly described or shown herein, embody the principles of the invention and are included within its spirit and scope.

Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention. Finally, and as noted before, the present invention is applicable to a number of storage and retrieval problems that would benefit from its particular characteristics—namely efficiency, speed, and determinism. In describing these characteristics—we have focused on only one such problem involving LPM. Those skilled in the art will readily appreciate that the present invention is applicable to any of a number of storage and retrieval problems and not just the exemplary LPM as described in detail herein.

Recall that the prior-art, relatively straightforward, naïve way to apply hash tables to the problem of LPM has a number of shortcomings. First, naïve hash tables incur collisions and resolve them using chaining, adversely affecting the worst-case lookup-rate guarantees that routers must provide. Second, hash functions cannot directly operate on wildcard bits, a requirement for LPM, and current approaches result in a large number of hash tables or an explosion in the number of prefixes due to CPE.

Accordingly, we first look at techniques that address the issue of collisions in hash tables. Because cryptographic hash functions, such as MD5 or SHA-1, are computationally difficult to sustain at the lookup and update rates prevalent in LPM, these schemes will not be considered.

Those skilled in the art will appreciate that having multiple hash functions instead of one is generally understood to incur fewer collisions and hence lesser chaining. The d-random scheme described by Y. Azar, A. Broder,and E. Upfal, in an article entitled "Balanced allocations" which appeared in *Proceedings of 26th ACM Symposium on the Theory of Computing*, in 1994 uses d hash functions to index into the same hash table. As implemented in this scheme, a key is inserted into the least loaded of the d buckets, wherein ties are broken randomly. And even though a lookup must examine all d buckets, there is high probability that each bucket will have only one key.

The d-left scheme described by Andrei Broder and M. Mitzenmacher in an article entitled "Using multiple hash functions to improve IP lookups", which appeared in *Proceedings of IEEE INFOCOM*, in 2001 is a simple variation of d-random in which there are d separate sub-tables, one for each of the d hash functions, wherein ties are broken via "left-most" choice. The advantage of d-left is that the d lookups can be done in parallel instead of sequentially. And while the probability of collisions is reduced through the use of these schemes, both schemes still incur collisions and must also examine d buckets per lookup.

The Extended Bloom Filter (EBF) scheme (See, e.g., Haoyu Song, Sarang Dharmapurikar, J. Turner and J. Lockwood, "Fast Hash Table Lookup Using Extended Bloom Filter: An Aid to Network Processing," In *Proceedings of the Annual ACM SIGCCOMM* 2005) extends the d-left scheme into a two-level data structure, where the first level is an on-chip counting Bloom Filter (See, e.g., an article by L. Fan, P. Cao, J. Almeida, and A. Broder entitled: "Summary cache: A scalable wide-area Web cache sharing protocol", that was published in the Proceedings of SIGCOMM '98, in 1998) and the second level is an off-chip hash table having as many locations as the first level. The scheme uses k hash functions to hash each key to k different locations in the Bloom Filter. After all keys have been hashed into the Bloom Filter, for each key the location with the smallest counter value is chosen and the key is inserted into the hash-table bucket corresponding to that Bloom Filter location. Accordingly, a lookup examines all k counters in the Bloom Filter and then accesses only the least loaded bucket in the hash table.

Song, et. al have shown that the probability of collision in the least-loaded bucket is small, thus achieving an expected one off-chip access per lookup. However, their approach requires the Bloom filter and hash table to be much larger than N, the number of keys. When the hash table has size 3N, 6N and 12N, then 1 in every 50, 1000 and 2,500,000 keys will respectively encounter a collision. Because the EBF scheme only reduces the probability of collisions and does not eliminate them, the scheme is vulnerable to denial-of-service attacks, and further, it requires complicated queueing and stalling mechanisms in a router pipeline.

In contrasting the present invention with prior art attempts to address the large number of hash tables in LPM it is notable that a scheme disclosed by Sarang Dharmapurikar, Praveen Krishnamurthy and David E Taylor, in an article entitled "Longest Prefix Matching Using Bloom Filters", that appeared in *Proceedings of the ACM SIGCOMM* 2003, in August 2003 employs a Bloom filter, one in front of each hash table, in order to query the membership of a given prefix in that table. With this Dharmapurikar et. al. scheme all Bloom filters are queried simultaneously and then only those tables with a positive query result are accessed sequentially, starting at the longest prefix length. As a result, the Dharmapurikar et. al. scheme reduces the expected number of tables searched, to just one or two. The difference between the Dharmapurikar et. al. scheme and that which is the subject of the present invention is not merely that Dharmapurikar et. al. uses Bloom filters and the present invention uses Bloomier filters however. In particular—and in sharp contrast to the present invention—the scheme described by Dharmapurikar et. al. does not address the hash-table collisions issue nor the issue of wildcard support.

According to another scheme described by Marcel Waldvogel, George Varghese, Jon Turner, Bernhard Plattner, in an article entitled "Scalable High Speed IP Routing Table Lookups," which appeared in *Proceedings of the ACM SIGCOMM* in 1997, the hash tables of each prefix length are augmented with information about contents of other tables, and then a binary search over the hash tables is performed. This scheme requires only O(log(maximum prefix length)) tables to be looked up in the worst case, but does not address the issue of collisions. Note that both the Dharmapurikar et.al. and Waldvogel et.al. schemes reduce only the number of tables searched and not the number of tables implemented. Finally, it is noted that since none of these prior-art schemes address the need for wildcard support in hash-tables, they all therefore must resort to controlled prefix expansion (CPE) for practical implementations—which unfortunately results in large and non-deterministic storage sizes.

Theory of Bloomier Filters

As noted earlier, the present invention employs the Bloomier filter which is an extension of Bloom filters (See, e.g., Bernard Chazelle, Joe Kilian, R. Rubinfeld and A. Tal, "The Bloomier Filter: An Efficient Data Structure for Static Support Lookup Tables", in *Proceedings, Symposium on Discrete Algorithms (SODA)*, 2004.) Advantageously while Bloom filters support only membership queries, Bloomier filters support storage and retrieval of arbitrary per-key information. Additionally—and according to an aspect of the present invention—Bloomier filters guarantee collision-free hashing for a constant-time lookup in the worst case.

The Bloomier filter stores some function $f:t \to f(t)$ for all keys t. The collection of all the keys is known as the key set. The process of storing these $f(t)$ values for all t is called function encoding, and the process of retrieving $f(t)$ for a given t is called a lookup. The data structure employed comprises a table indexed by k hash functions—which is known as the Index Table. The k hash values of a key are collectively referred to as its hash neighborhood, represented by HN(t). If some hash value of a key is not in the hash neighborhood of any other key in the set, then that value is said to be a singleton.

The Index Table is constructed such that for every t, a location τ(t) is found among HN(t) such that there is a one-to-one mapping between all t and τ(t). Because τ(t) is unique for each t—collision-free lookups are guaranteed. Note that this one-to-one mapping does not mean that τ(t) cannot be in the hash neighborhood of any key other than t, it only means that τ(t) is unique for each t.

Later, the algorithm for finding such a one-to-one mapping will be described and, and through a careful choice of the design parameters the probability of finding such mapping is arbitrarily close to 1. For now however, it is assumed that this mapping is possible.

The idea is to setup the Index Table, so that a lookup for t returns τ(t). Then we can store $f(t)$ in a separate Result Table at address τ(t) and thereby guarantee deterministic, collision-free lookups of arbitrary functions. Note that because it will be accessed using τ(t) as an address, the Result Table must have as many locations as the Index Table.

While each t does have a unique τ(t), determining τ(t) during lookup is not straightforward. If the hash functions are numbered 1 through k, let us call the hash function which hashes t to location τ(t) as the $h_\tau(t)$'th function. During lookup, we do not know which function is $h_\tau(t)$: $h_\tau(t)$ is known only during function encoding and not during lookup. Therefore, during lookup, τ(t) could be any one of the k locations in HN(t).

Encoding the Index Table

In order to retrieve τ(t) without knowledge of $h_\tau(t)$, one approach is to store some value in location τ(t), such that a simple Boolean operation over all k values in HN(t) necessarily yields $h_\tau(t)$. More specifically—during encoding—once we find τ(t) for a certain t, we write V(t) from Equation 1 into the location τ(t). Because τ(t) is unique for each t, we are guaranteed that this location will not be altered by the encoding of other keys. Note that in Equation 1, "^" represents the XOR operation, $H_i(t)$ is the i'th hash value of t, $D[H_i(t)]$ is the data value in the $H_i(t)$'th location of the Index Table, $h_\tau(t)$ identifies which hash function produces τ(t), and k is the total number of hash functions. The result of the above computation, V(t), is stored in location τ(t) (hence also called $D[H_{h_{\tau(t)}}(t)]$ in Equation 1). Now during a lookup for t, $h_\tau(t)$ can be retrieved by a simple XOR operation of the values in all k hash locations of t, as given in Equation 2.

$$D[H_{h_{\tau(t)}}(t)] = V(t) = \left( \bigwedge_{\substack{i=1 \\ i! = h_\tau(t)}}^{i=k} D[H_i(t)] \right) \wedge h_\tau(t) \quad [1]$$

$$h_\tau(t) = \bigwedge_{i=1}^{i=k} D[H_i(t)] \quad [2]$$

We can use $h_\tau(t)$ in turn to obtain τ(t), either by recomputing the $h_\tau(t)$'th hash function or by remembering all hash values and selecting the $h_\tau(t)$'th one. We can then read $f(t)$ from the location τ(t) in the Result Table. Note that this encoding of $h_\tau(t)$ will get corrupted if the encodings for subsequent keys alter any of the values in HN(t). Such corruption can be prevented if all the keys are encoded in a careful ordering.

With these thoughts in mind, we may now describe the algorithm disclosed by Bernard Chazelle, Joe Kilian, R. Rubinfeld and A. Tal, in an article entitled "The Bloomier Filter: An Efficient Data Structure for Static Support Lookup Tables", which appeared in *Proceedings, Symposium on Discrete Algorithms (SODA)*, 2004. As will become apparent to those skilled in the art, this method is useful for discovering both τ(t) for all t, and the specific order in which to perform function encoding for each t.

The Bloomier Filter Setup Algorithm

With simultaneous reference to FIG. 1A-FIG. 1D, we can illustrate the setup algorithm for finding τ(t) for all t and the ordering Γ. We first hash all keys into the Index Table and then make a single pass over the entire table to find keys that have any singletons (locations with no collisions). All these keys with singletons are then pushed onto the top of a stack. The keys are considered one by one starting from the bottom of the stack, and removed from all of their k hash locations in the Index Table (but not from the stack). The affected locations are examined for any new singletons, which are then pushed onto the top of the stack. Then the next key in the stack is considered and so on. This process is repeated until the Index Table becomes empty. The final stack, considered top to bottom, represents an ordering Γ.

As can be appreciated, Γ ensures that every key t has at least one unique hash location τ(t) in its hash neighborhood (i.e., the singleton location that caused t to get pushed onto the stack), such that it is not in the hash neighborhood of any of the keys appearing before t in the order Γ (otherwise it would not have been a singleton). We can now process the keys in order Γ, encoding V(t) into τ(t) for each t, using Equation 1.

Figure 1D:
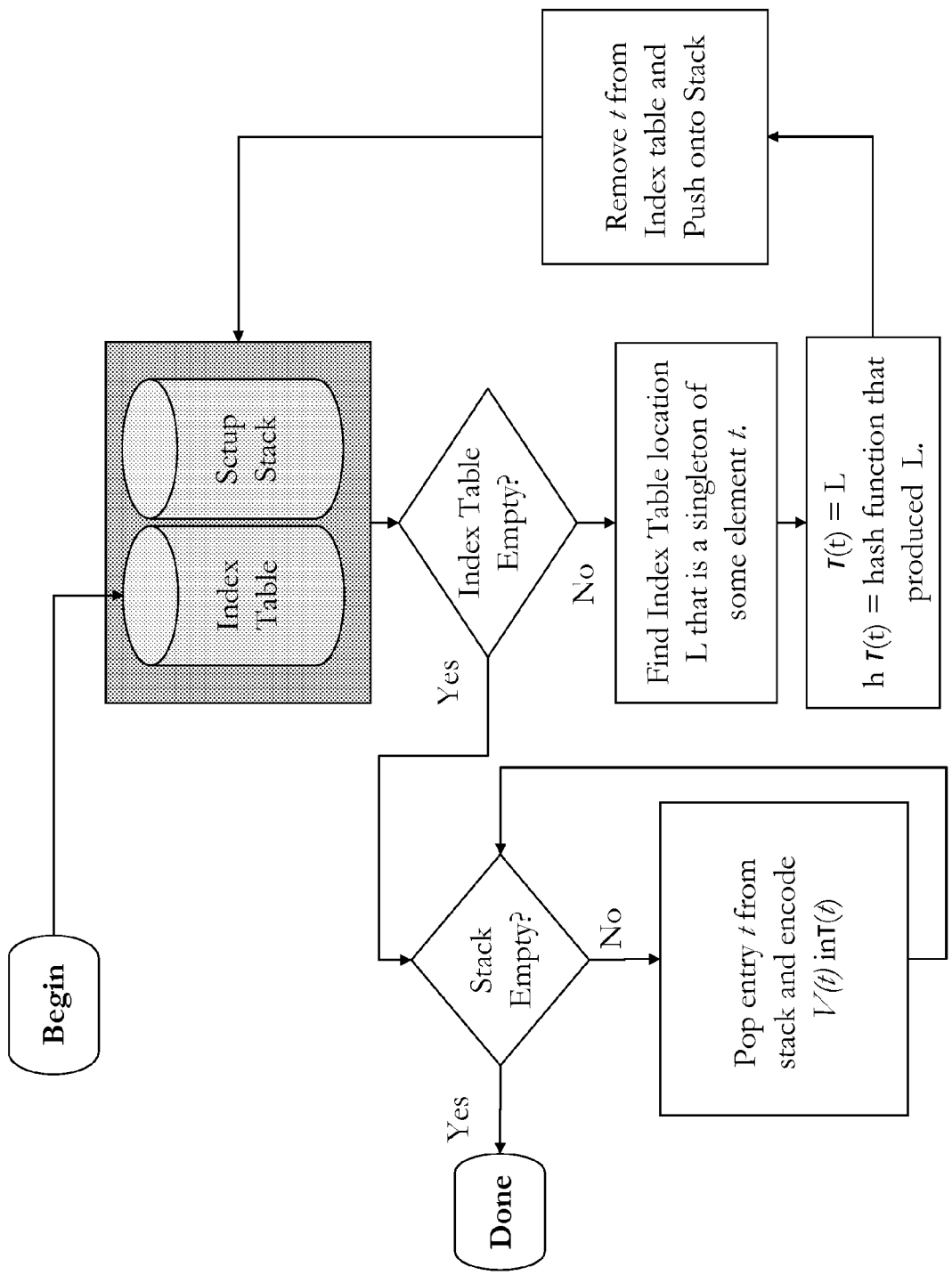
Figure 2:
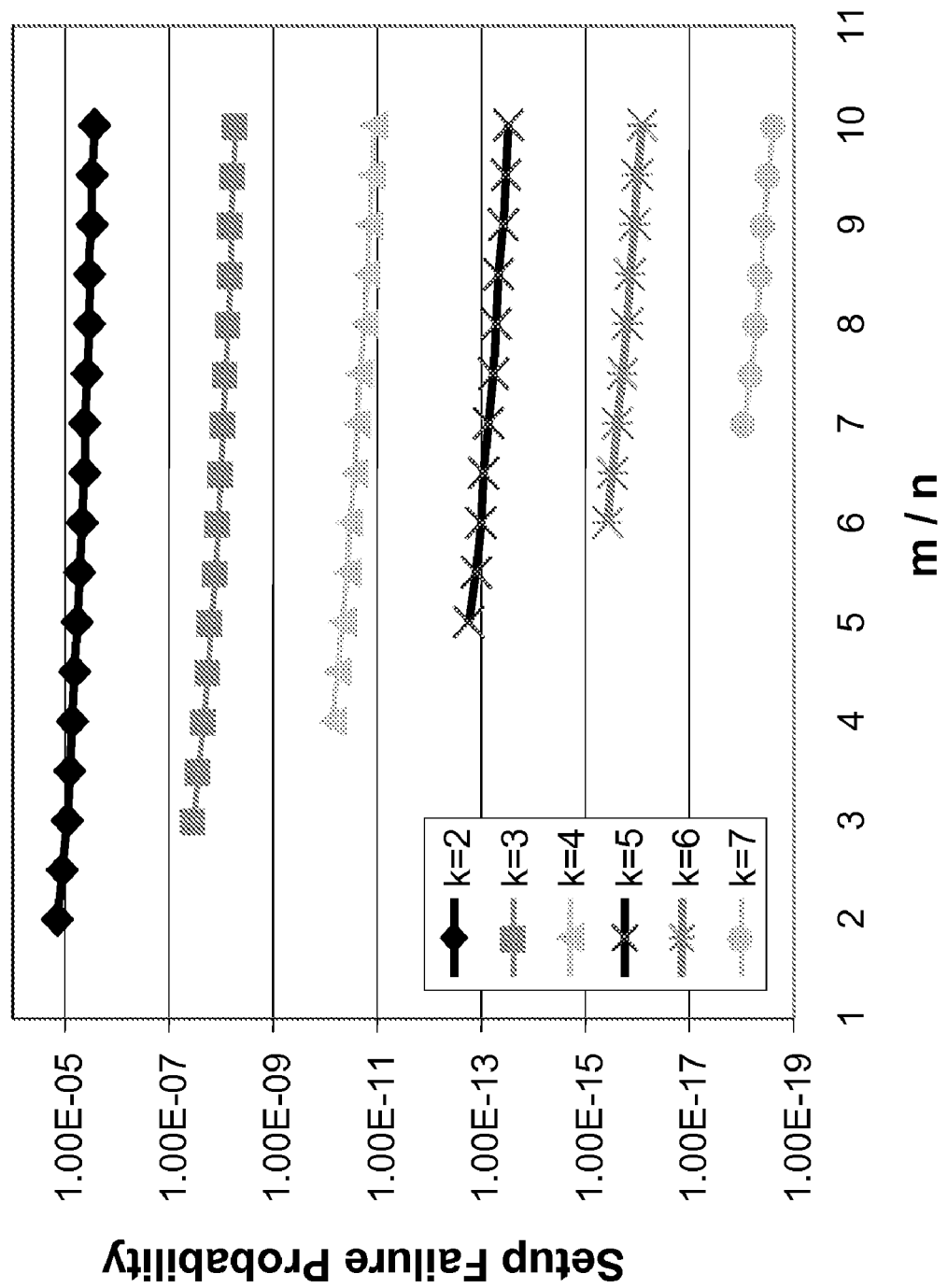
FIG. 2 is a graph showing setup failure probability variation (for n=256K) with Index Table size and number of hash functions.

With continued reference to FIGS. 1A-1D, all index table locations are initialized to zero, and the first key $t_1$ (i.e., top of the stack), is encoded by storing $V(t_1)$ in location $τ(t_1)$. The second key $t_2$, has a $τ(t_2)$ location that is not in the hash neighborhood of $t_1$. Therefore $V(t_2)$ can be safely written into $τ(t_2)$ with the guarantee that no location in the hash neighborhood of $t_1$ will be affected. Similarly for $t_3$, we are guaranteed that writing $V(t_3)$ to location $τ(t_3)$ will not affect the hash neighborhood of $t_1$ or $t_2$. This guarantee continues to inductively hold for all keys as we encode them in order Γ. Therefore, lookups are guaranteed to obtain the correct $h_\tau(t)$ values for all t using Equation 2. The running time of the setup algorithm is O(n) for n keys, because each key is pushed onto the stack once, and never removed, and one location is modified for each key's encoding. A flowchart depicting the Bloomier filter setup is shown in FIG. 1D.

The CHISEL Architecture

Recall once again that Bloomier filters suffer from at least the following shortcomings when applied to LPM. First, they exhibit numerous false positives which lead to misrouting and packet-loss. Second, they are not designed to handle wildcards, and hence for LPM they must resort to either a large number of tables or an explosion in the number of prefixes due to CPE. Finally, and like other prior-art collision-free hashing schemes, Bloomier filters support only a static set of keys without incremental updates. (See, e.g., B. Chazelle, J. Kilian, R. Rubinfeld and A. Tal, "The Bloomier Filter: An Efficient Data Structure for Static Support Lookup Tables", in *Proceedings, Symposium on Discrete Algorithms (SODA)*, 2004) Before we describe how the architecture according to the present invention addresses each of these shortcomings, we first describe the convergence of the Bloomier Filter setup algorithm.

Convergence of the Setup Algorithm

As described previously (See., e.g., U.S. Pat. No. 7,019,674 and United States patent application No. 2005/0187898 for additional background), at each step the setup algorithm removes some key from the Index Table and then searches for new singletons. As long as the algorithm can find at least one new singleton at each step, forward progress is guaranteed. If at some step a new singleton is not found then the algorithm fails to converge.

It is understood that for a Bloomier Filter with k hash functions, n keys and an Index Table size m≧kn, the probability of setup failure P(fail) is upper bounded as defined in Equation 3. (note that m<kn is not considered, as it means that the Index Table has fewer locations than the number of incoming hashes, implying a load factor>1):

$$P(\text{fail}) \leq \sum_{s=1}^{n} \left( \frac{e^{k/2+1}}{2^{k/2} s} \right)^s \left( \frac{sk}{m} \right)^{sk/2} \quad [3]$$

Figure 3:
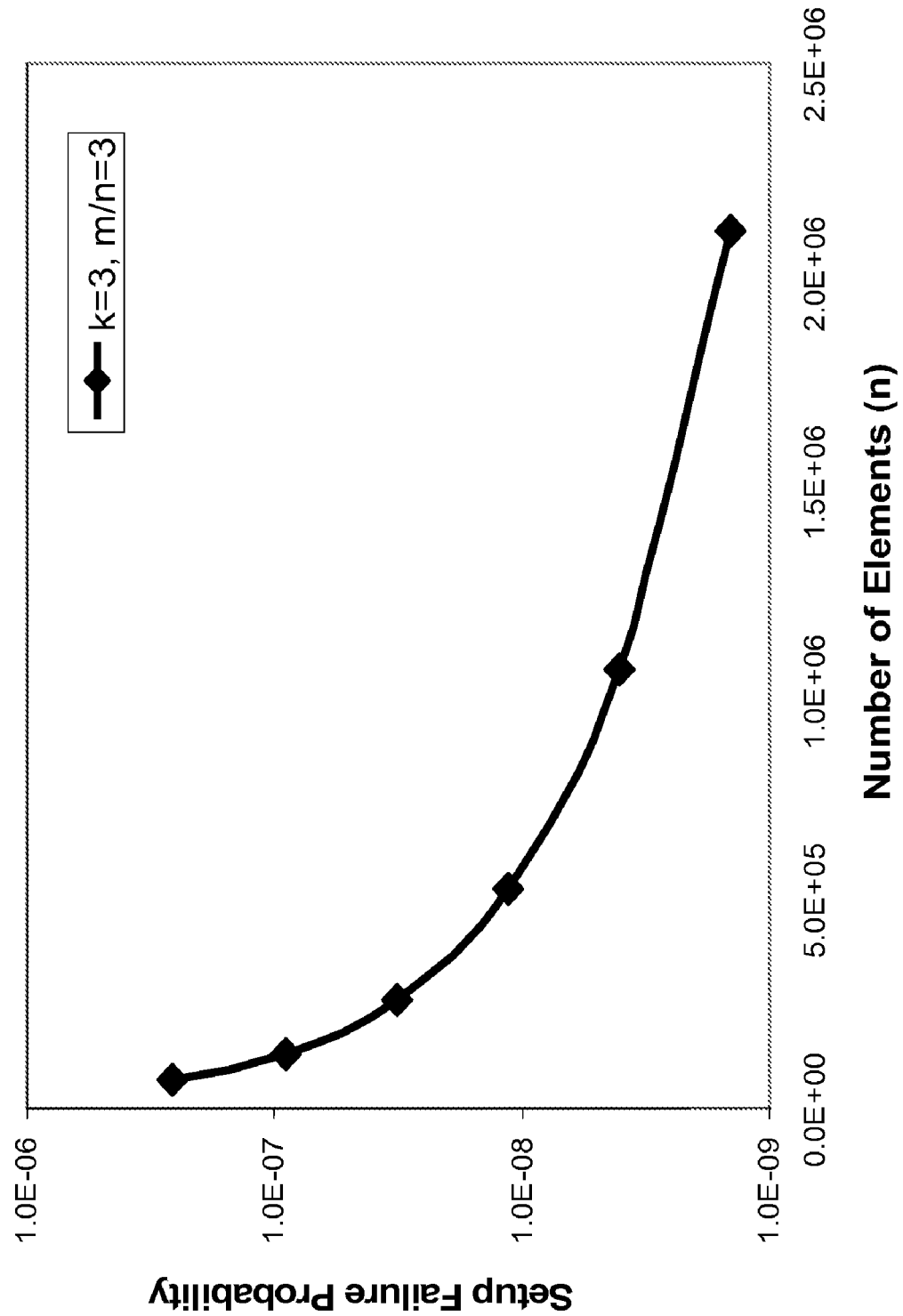
FIG. 3 is a graph showing the probability of setup failure with increasing n.

We may understand how P(fail) varies with m, the Index Table size, and k, the number of hash functions. FIG. 3 is a graph of P(fail) versus the ratio m/n for n=256K keys. There is a separate curve for each value of k.

We note that the failure probability decreases marginally with increasing m/n, but decreases significantly with increasing k. A high value of k however comes at the expense of large storage (to maintain m≧kn), chip area and increased power dissipation. Hence, a system architect must choose a suitable value of k to balance system cost against probability of setup failure.

Turning our attention now to FIG. 3, there is shown a graph of P(fail) versus n while fixing k=3 and m/n=3. One observation from this FIG. 3 is that P(fail) decreases dramatically as n increases. In fact for values of n typical in LPM applications (a few hundred thousand), P(fail) is about 1 in 10 million or smaller (i.e., 1 setup out of 10 million setups may fail to converge).

For the purposes of the present invention, we choose k=3 and m/n=3 because this design point provides a failure probability of less than 1 in 10 million, yet yields a total storage requirement of only 8 bytes per IPv4 prefix. It is worth noting that m/n=3 is much smaller than what is required by EBF, where the hash table size needs to be almost 13 times the number of keys for a probability of collision equal to 1 in 2,500,000.

Removing False Positives

A false positive can occur when a Bloomier filter lookup involves some key t which was not in the set of original keys used for setup. t will hash to some k locations and Equation 2 will produce some arbitrary value for $h_\tau(t)$ and hence $\tau(t)$. The lookup will then fetch whatever $f(t)$ lies at location $\tau(t)$. The prior art addresses such false positives by concatenating a checksum c(t) to $h_\tau(t)$ and using this concatenation in place of $h_\tau(t)$ in Equation 1 during setup. Consequently, Equation 2 yields this concatenation during lookup. A lookup for key t computes c(t) and verifies it against the checksum obtained from the concatenation, before using $h_\tau(t)$ to get $f(t)$. As can be appreciated by those skilled in the art, the wider this checksum field the smaller the probability of false positives (PFP). Thus, such prior-art methods effectively sacrifice storage space for a reduced PFP.

Recall also that a non-zero PFP means that some specific keys will always incur false positives, leading to permanent mis-routing and packet-loss for those destinations. Therefore a non-zero PFP, no matter how small, is unacceptable for LPM.

According to an aspect of the present invention, a storage-efficient scheme that eliminates false positives for an LPM scheme involves storing in the data structure, all original keys, and match them against the lookup keys.

Of course, a straightforward, relatively naïve way to store the keys would be to place each key t alongside its $f(t)$ value in a Result Table. However, the Result Table has as many locations as an Index Table (i.e., m≧nk), but only n locations are really needed to store the n keys. Therefore the naïve way needs to provision at least k times more storage than what is needed to actually store all the keys.

According to the present invention, the sizes of the Index and Result tables are disassociated by using one level of indirection. In a preferred embodiment this is performed during setup where we may encode a pointer p(t) for each t instead of encoding $h_\tau(t)$. p(t) directly. The pointer points into a Result Table having n locations. Thus, the Index Table encoding equation Equation 1 is modified as follows:

$$V(t) = D[H_{h_{\tau(t)}}(t)] = \left( \bigwedge_{\substack{i=1 \\ i! = h_{\tau(t)}}}^{i=k} D[H_i(t)] \right) \wedge p(t) \quad [4]$$

According to the present invention—during lookup—p(t) is extracted from the Index Table (using Equation 2), and both $f(t)$ and t are read from the location p(t) in the Result Table. The lookup key is then compared against the value of t. If the two match then $f(t)$ is a correct lookup result, otherwise it is a false positive.

In order to facilitate hardware implementation, a preferred embodiment of the present invention uses two separate tables to store $f(t)$ and t, the former being the Result Table and the latter the Filter Table (as it filters false positives). Note that both still have the same number of locations and are still accessed with the same p(t) as described above.

Figure 4:
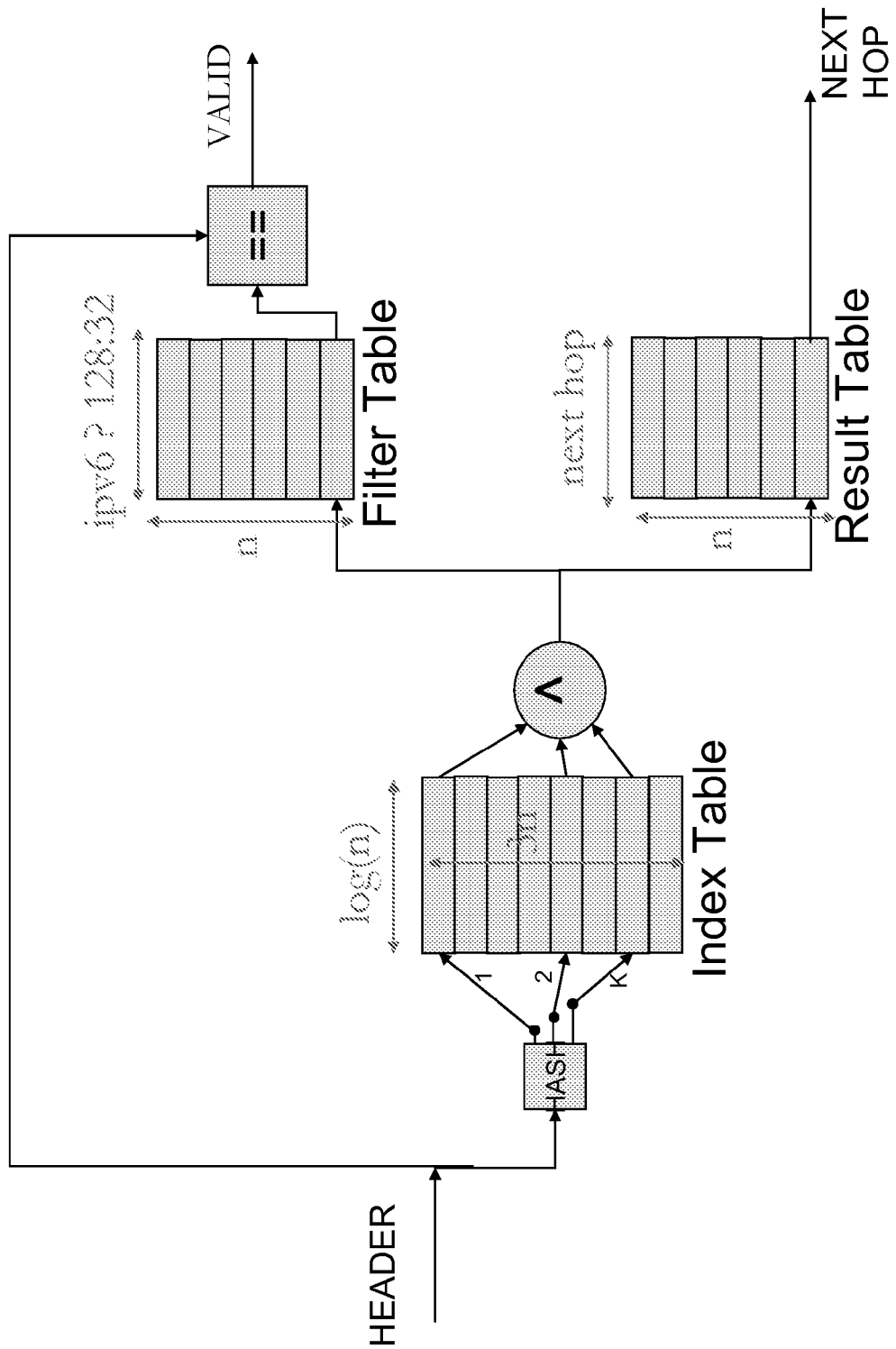
FIG. 4 is a block diagram showing index, filter, and results tables in an architecture according to the present invention.

Turning now to FIG. 4, there is shown the Index, Filter and Result Tables. As can be observed from this FIG. 4, as the Index Table stores pointers with maximum value n, its width is $\log_2(n)$ bits. In contrast, the prior-art, naive approach would encode $h_\tau(t)$ into the Index table, requiring only $\log_2(k)$ bits. Thus, the present invention incurs an increase in the Index Table size. However owing to the k-fold reduction in the sizes of Filter and Result Tables, the present invention reduces the overall storage by up to 20% and 49% for IPv4 and IPv6 respectively, when compared to the prior-art, naïve approach.

Supporting Wildcards

As noted earlier Bloomier filters, like other hash-based approaches, do not address the issue of supporting wildcard bits in the keys. Because hash functions cannot operate on wildcard bits, and assuming a specific bit-value for the wildcard bits in prefixes may cause erroneous lookup results, a separate hash table is required for each prefix length.

Of course having a large number of tables results in considerable hardware complexity and cost. The problem only gets worse when longer prefixes like IPv6 are used. As noted, the prior-art solution to reduce the number of unique prefix lengths is CPE. Recall that CPE expands a single prefix of length x into a number of prefixes of length x+l by replacing l of its wildcard bits with their $2^l$ possible bit-values.

Deterministically sizing hash-tables for a given number of prefixes (before applying CPE) requires provisioning for worst-case CPE expansion, resulting in huge amounts of memory. Thus, we see that efficiently supporting wildcards has not been addressed by any of the previous efforts on hash-based lookups, and they all resort to either a large number of tables or large storage space due to CPE.

Prefix Collapsing and Bit-Vectors

According to the present invention, a technique called prefix collapsing is employed which efficiently supports wildcard bits. In contrast to CPE, prefix collapsing converts a prefix of length x into a single prefix of shorter length x−l ($l \geq 1$) by replacing its l least significant bits with wildcard bits. The maximum number of bits collapsed is called the stride.

Note that deterministically sizing the tables after prefix collapsing requires only one storage location per original prefix. Obviously a number of prefixes may become identical to each other after they have been collapsed to the same length. Such "identical" prefixes will collide in the same Index Table locations and consequently collide into the same Result and Filter Table entries. Resolving these collisions using the naïve approach of chaining is unacceptable as it would not produce collision-free hashing.

We make the key observation—and according to the present invention—that prefixes colliding to the same Bloomier filter location due to prefix collapsing differ only in the bits that were collapsed. Because the bits remaining after collapsing are identical among the colliding prefixes, we need to insert only one copy of the collapsed, identical prefix in the Index Table. Furthermore—and as can be readily appreciated by those skilled in the art—the Filter Table we needs to store only enough information to be able to disambiguate the bits that were collapsed, and not all the entire prefixes.

Consequently, if the stride is l then $O(2^l)$ different prefixes can collide, implying that we can disambiguate the collided prefixes in each location by using a bit-vector of $2^l$ bits. Thus we resolve the collisions due to collapsing without using chaining, resulting in a deterministic $O(1)$ lookup time in the worst case.

Figure 5:
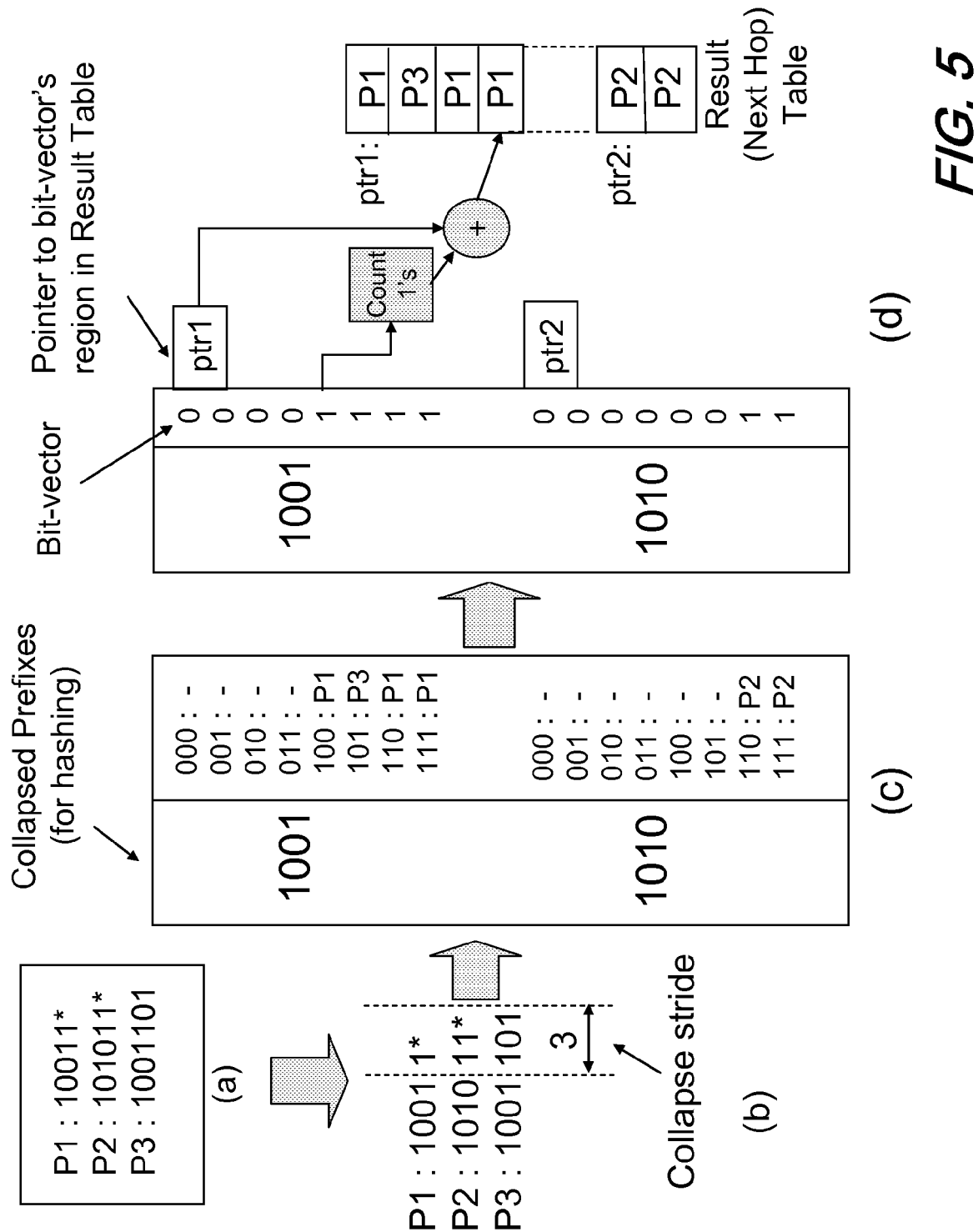
FIG. 5 is a block diagram showing prefix collapsing (a) in an example prefix database; (b) using a collapse stride of 3; (c) collapsed prefixes; and (d) bit vectors and pointers into a Result Table, according to the present invention.

Turning now to FIG. 5, there is shown an example illustration of prefix collapsing and bit-vector disambiguation according to the present invention. More particularly, FIG. 5(a) shows 3 prefixes P1, P2 and P3 having lengths 5, 6 and 7 respectively. For an exemplary stride of 3, we get 2 collapsed prefixes 1010 and 1001, each of length 4—which are shown in the left column of FIG. 5(c).

Because the stride is 3 bits, a collapsed prefix may correspond to 8 original prefixes. The right column of FIG. 5(c) shows those 8 prefixes for each entry in the left column. FIG. 5(d) shows how the bit-vectors are actually implemented.

Note that each bit-vector may correspond to multiple Result Table entries. Therefore, each bit-vector stores a pointer to its corresponding region in the Result Table. The number of ones in the bit-vector provides an offset for this pointer, and the Result Table is indexed using the sum of the pointer and offset. FIG. 5(d) also shows an example lookup of the bit-vector and Result Table.

Figure 6:
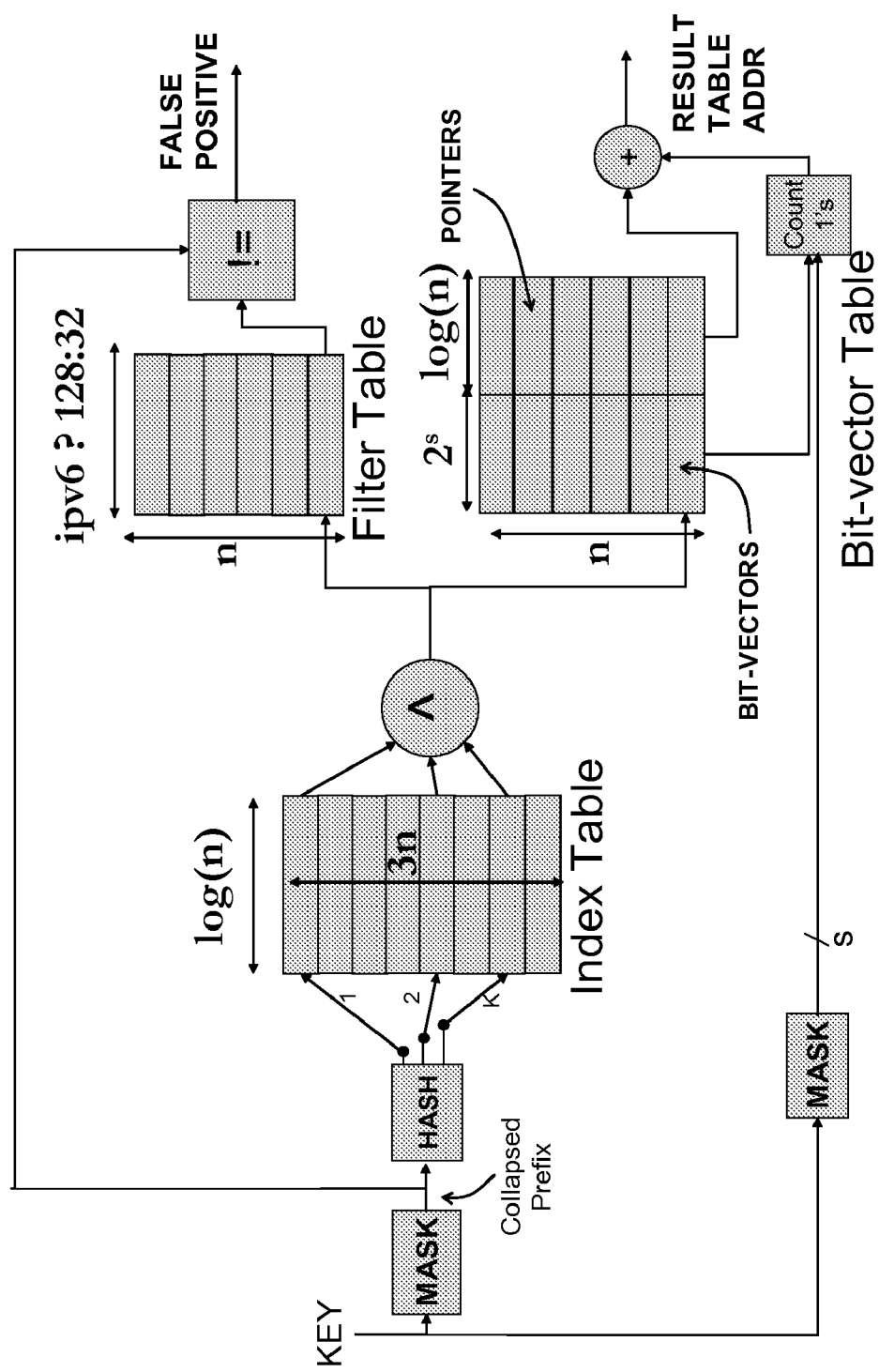
FIG. 6 is a block diagram showing an architecture according to the present invention including bit-vector table(s) for wildcard support.

Turning our attention now to FIG. 6 there it shows an architecture having a Bit-vector Table according to the present invention. Preferably, the Bit-vector Table has the same depth as the Filter Table and stores a bit-vector for each collapsed prefix. The Result Table is conveniently stored in commodity DRAM and accessed once at the end of a lookup. Similarly to other LPM schemes, next-hop values may be stored off-chip.

In sharp contrast to these other schemes however, an architecture according to the present invention (excluding the next-hop values) advantageously fits on-chip and does not communicate back and forth with off-chip data. Deterministically sizing for n original prefixes, the Index Table has a depth of 3n (recall earlier we chose m/n=3), the Bit-vector Table and the Filter Table are of depth n. Note that this sizing guarantees that the architecture can hold n prefixes in the worst case regardless of their distribution or collapse behavior. Note further that while for this example we have chosen m/n=3, those skilled in the art will readily appreciate that m may be any value larger than 3n.

Setup and Lookup with Bit-Vectors

We now illustrate table setup and lookup using the example from FIG. 5. With a stride of 3, prefixes P1, P2 and P3 are collapsed into prefixes 1010 and 1001. These two collapsed prefixes are encoded into the Index Table using the Bloomier Filter setup algorithm (Equation 1). Each prefix in the Index Table is allocated a single unique Filter Table address thereby permitting false positive checking. This Filter Table address also serves as the Bit-vector Table address where the bit-vector of the prefix will be stored. In this example, we have 2 collapsed prefixes, and therefore need Filter and Bit-vector Tables of depth 2 each.

We arbitrarily allocate addresses 0 and 1 to the two collapsed prefixes. The values "1010" and "1001" are stored in the Filter Table at addresses 0 and 1, respectively. Next, bit-vectors are constructed for each collapsed prefix. We store the bit-vector for 1010 (which is 00001111) at address 0 and the bit-vector for 1001 (which is 00000011) at address 1 in the Bit-vector Table. Each collapsed prefix, and hence each bit-vector, is associated with a contiguous region in the Result Table, where the next hops for the original prefixes are stored.

The size of each region should be at least equal to the number of 1's in its corresponding bit-vector. In practice the region sizes are slightly over-provisioned to accommodate future adds. For both bit-vectors, we allocate suitably sized memory blocks in the Result Table memory, obtaining pointers ptr1 and ptr2, which we store next to their corresponding bit-vectors.

For the purposes of further example, suppose we now have to lookup a key, say 1001100. The first 4 bits (1001) are used to lookup the Index Table, obtaining address 0 (which was encoded for collapsed prefix 1001), where bitmap 00001111 is stored in the Bit-vector Table. The collapsed bits 100 (i.e., 4) are used to index within this bit-vector and count the 1's. The number of 1's in bit-vector 00001111 up to the $4^{th}$ bit is 1. Hence the Result Table address is ptr1+1−1=ptr1 (the −1 assumes that Result Table addresses start from 0 rather than 1). The next hop stored at address ptr1 corresponds to P1, which is the correct result for 1001100. In parallel with the Bit-vector Table lookup, a false positive check in the Filter Table verifies that the bits remaining after collapsing the lookup key match "1001".

Each instance of the structures depicted in FIG. 6 is referred to as a Chisel sub-cell. The Chisel architecture for the LPM application comprises of a number of such sub-cells, one for each of the collapsed prefix lengths $l_1 \ldots l_j$. Prefixes having lengths between $l_i$ and $l_{i+1}$ are stored in the sub-cell for $l_i$. A lookup collapses the lookup-key to lengths $l_1 \ldots l_j$, and searches all sub-cells in parallel. The results from all sub-cells are sent to a priority encoder, which picks the result from that matching sub-cell which corresponds to the longest collapsed length.

Prefix Collapsing Algorithm

Figure 7C:
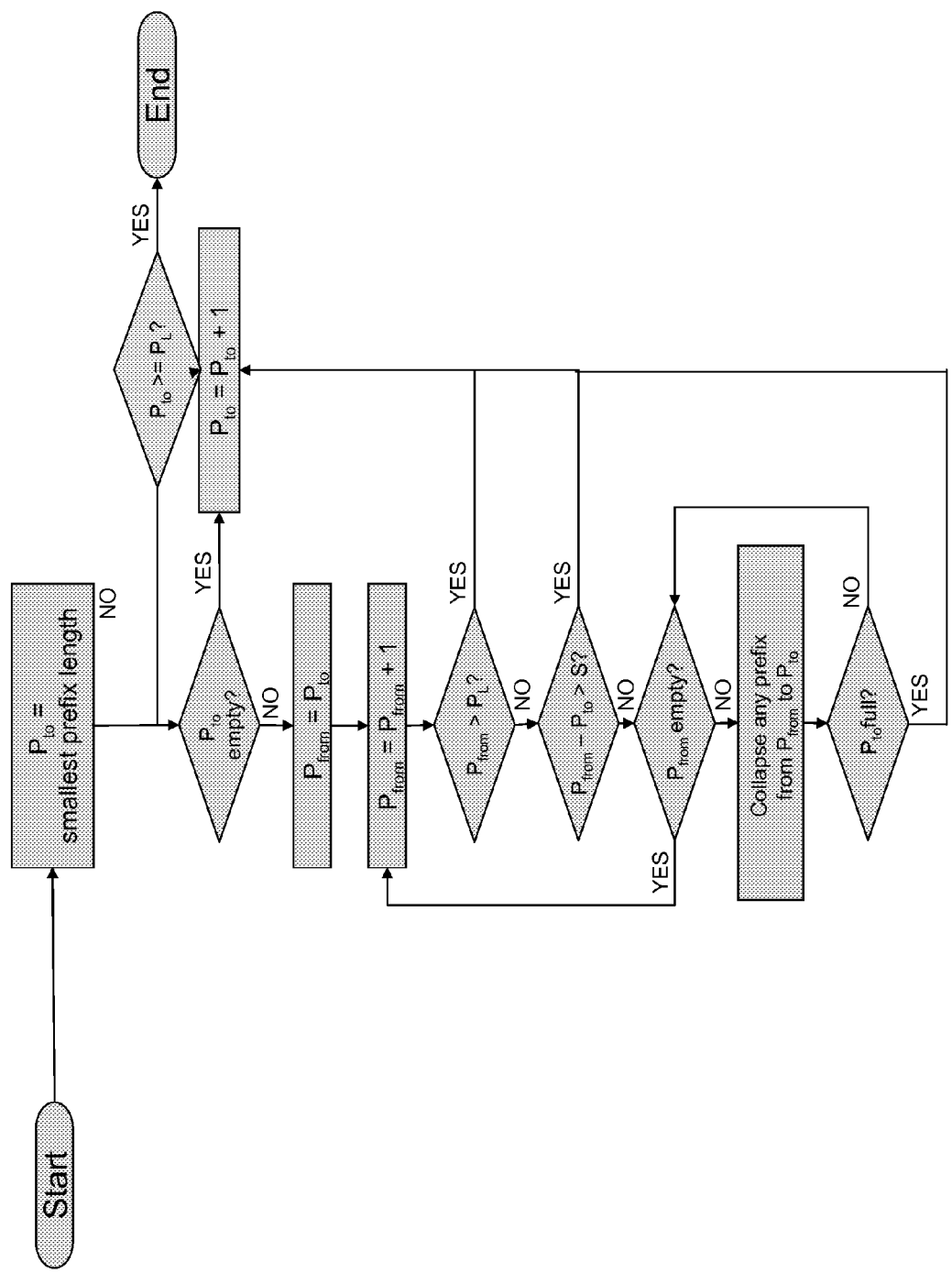
FIG. 7(C) is a flowchart showing prefix collapsing procedure according to the present invention.

According to the present invention, a "greedy prefix collapsing algorithm" is employed, starting from the shortest populated prefix length $l_1$. We collapse prefixes from progressively larger prefix lengths to $l_1$, stopping when the maximum collapse stride has been reached. We then proceed to the next populated prefix length $l_2$, and continue the same process. Advantageously, fixing the stride to some bounded value allows deterministic sizing of the bit-vectors. A prefix collapsing routine according to the present invention is shown in a flowchart of FIG. 7(C).

Incremental Updates

As can be appreciated by those skilled in the art, devices that employ hash-based schemes of the present invention—for example Routers—must be able support dynamic updates, such as route-flaps, re-routing due to traffic congestion, and other routing protocol operations. Therefore any useful LPM architecture must support fast and incremental updates. The Bloomier Filter, however, supports only a static set of keys. To address this shortcoming, architectures according to the present invention include extensions based on certain heuristics, in order to support fast and incremental updates.

To understand these heuristics, we first observe that in real update traces, 99.9% of the prefixes added by updates are such that when those prefixes are collapsed to an appropriate length, they become identical to some collapsed prefix already present in the Index Table. Consequently, we need to update only the Bit-vector Table, and not the Index Table, for these updates.

Additionally, we observe that in real update traces a large fraction of updates are actually route-flaps (i.e., a prefix is added back after being recently removed). Therefore, upon prefix removal we temporarily mark the prefix as "dirty" and temporarily retain it in the Index Table—instead of immediately removing it.

A preferred embodiment of the present invention will maintain a shadow copy of the data structures in software. The software can run on, for example, the Network Processor and DRAM that is invariably present on the same line card as the forwarding engine. When an update command is received, we first incrementally update the shadow copy, and then transfer then modified portions of the data structure to the hardware engine. All updates in LPM can be classified into two categories, which are appropriately represented by the BGP update operations withdraw and announce.

Withdraw

The operation withdraw(p, l) removes a prefix p of length l from the table (if it exists). FIG. 7(A) is a pseudocode listing showing the incremental update algorithm for withdraw(p,l). With reference to that FIG. 7(A), the operation first determines the prefix length interval (low, high) within which l lies, and collapses p to length low obtaining a collapsed prefix pc. A check is then performed to determine if pc is present in the Index table, by looking it up, and using the Filter Table to identify any false positives. If pc is not present, no further action is required. If pc exists however, it must have a bit-vector B corresponding to it.

Accordingly, we need to modify B to reflect the withdraw operation. In order to update B, we expand p to length high and obtain $2^{high-l}$ prefixes. For each expanded prefix p', we obtain an index into B using the last high-low bits of p'. Say the bit at the indexed location of B is b. If b is 0, p' does not exist, and hence does not need to be removed. If b is 1, some prefix p" mapping to bit b exists. We only need to take action (i.e., remove the prefix) if the original prefix length of p" is exactly equal to l. If this is the case, we find the longest prefix p'" within bit-vector B such that it also maps to bit b. If such a prefix p'" exists, the next hop corresponding to b must be changed to the next hop of p'" under the semantics of longest prefix matching. If p'" does not exist, b is made 0 since no prefix corresponds to it.

If all bits in B become 0, then collapsed prefix pc can be removed from the Index Table. Instead, we temporarily mark pc as dirty in the Filter Table, but do not remove it from the Index Table until the next re-setup. Doing so ensures that a route-flap will simply restore pc from its dirty state, instead of requiring a new re-setup. Upon re-setups any dirty entries are purged from all tables including the Index Table.

Announce

The operation announce(p, l, h) FIG. 7(B) adds a prefix p of length l and next hop h to the routing table. If p already exists in the table, then its next hop value is updated to the new value h. As can be readily appreciated, announce(p, l, h) is similar to withdraw(p, l) and it is shown as a pseudocode listing in FIG. 7(B). Descriptively, we first determine the prefix length interval (low, high) within which l lies, and collapse p to length low obtaining a collapsed prefix pc. We then lookup pc to check if it is present in the Index table, and use the Filter Table to identify false positives.

If pc is present in the Index Table, it may be marked "dirty" in the Filter Table, and if so we simply clear the dirty bit. In either case, as pc is present in the Index Table, a bit-vector B for pc exists, and we have to update it to reflect the announce operation. In order to update the bit-vector B, we expand the given prefix p to length high and obtain $2^{high-l}$ prefixes.

For each expanded prefix p', we obtain an index into B using the last high-low bits of p', and check that bit b. If b is 1, some prefix p" mapping to b in bit-vector B exists, giving rise to two possibilities. The first possibility is that the original prefix length of p" is larger than l. In this case, we do nothing since longest prefix matching dictates that p" has precedence over the new announcement p. The second possibility is that the original prefix length of p" is not greater than l, in which case we only have to update the next hop entry in the Result Table pertaining to b. On the other hand, if b is 0, no prefix mapping to b in bit-vector B exists, and we simply change the value of b to 1. Note that doing so changes the number of one's in B, hence we may need to allocate a new block of appropriate size in the Result Table and free the previous one. We then populate the new block with the next-hop values, including next-hop h for p.

The allocation, and de-allocation of the Result Table blocks, are incremental operations, and are similar to what many trie-based schemes do upon updates for variable-sized trie-nodes. All withdraws and the abovementioned category of announces are performed on the bit-vector and Result Table blocks only, and can therefore be performed quickly. Advantageously, our experimental evaluation indicates that 99.9% of all updates fall in this category and thus can be applied incrementally. Once the bit-vectors are updated, the changed bit-vectors alone need to be written to the tables in the hardware engine.

If collapsed prefix pc is not present in the Index Table, it must be added to it. Again, there are two possibilities. First, pc has a singleton (i.e., one of its hash values points to a location in the Index Table that is not in the hash neighborhood of any other prefix). In this case, addition is easy since we can encode pc into the Index Table by simply writing V(t) into the singleton location using Equation 4. We then modify the bit-vector as explained above for other announce cases. As we show from our experiments, finding singletons is extremely common.

The second case is when pc has no singleton, and the Index Table (Bloomier Filter) has to be setup all over again. The setup algorithm exhibits a complexity that is linear with the number of prefixes. In order to enable faster setup, we logically partition the prefixes in into d groups, and the Index Table into d sub-tables. The partition to which a prefix belongs is determined by a $\log_2(d)$-bit hash-checksum computed on the prefix.

A collapsed prefix has an equal probability of being in any of the d sub-tables, ensuring uniform load on each sub-table. The setup time for each of the sub-tables is d times faster than the setup time for a single monolithic Index Table. The appropriate sub-table is setup in software, and the new memory contents of the sub-table alone are loaded into the hardware engine. Note that the actual implementation of the Index Table is still monolithic, the logical partitioning is achieved by using the $\log_2(d)$-bit hash-checksum for each prefix as the most significant bits when accessing the Index Table both for setup and lookup.

Methodology

In order to experimentally evaluate a scheme employing the present invention, an architectural simulator for which incorporates embedded DRAM models. The timings assumed by the simulator are based on access-time estimates for various embedded memories employed as well. In addition to functional operation and verification, the simulator reports storage sizes and power dissipation estimates.

In all our storage space results, we do not report the space required to store the next-hop information (i.e., the Result Table). Because all schemes that we evaluate keep this next-hop information off-chip in commodity memory, they are equivalent in this aspect.

We use two different sets of real routing tables as benchmarks, both sets including tables from geographically diverse locations. For all experiments, except the update evaluation, we use a set of prior-art BGP tables. This set has a large number of tables which consistently contain more than 140K prefixes. However, traces of update traffic for these tables are not generally available. In fact, public availability of real update traces is scarce.

Because Routing Information Service http://www.ripe.net/ris/provides routing tables with real update traces we use these tables and traces for update evaluations. We do not use these routing tables from for all experiments performed because they are few in number, and some of them are fairly small (i.e., smaller than 100K prefixes). For worst-case analyses, no benchmarks are actually needed, only table sizes need be known, which we assume as required for the experiments. Lastly, for studying scalability for significantly large IPv6 tables, we generated synthetic tables using the real prior-art tables as distribution models.

Results

Within the family of hash-based LPM solutions, we may now evaluate our architecture of the present invention against the latest prior-art scheme EBF. However, because EBF does not address the issue of wildcard bits, it must resort to using CPE.

As now apparent to those skilled in the art, the architecture which is the subject of the instant invention uses prefix collapsing to support wildcard bits. As a result a simple comparison of that architecture against the combination of EBF and CPE will not reveal the contributions due to prefix collapsing or the contributions from the basic hashing schemes. Therefore, we first assume that there are no wildcard bits (hence only one hash table is needed) and evaluate the architecture without prefix collapsing against EBF without CPE. Second, we evaluate the architecture with prefix collapsing against the architecture with CPE, thus isolating the impact of different contributions. Lastly, we show the overall comparison of our final architecture according to the present invention against EBF with CPE.

Next, we investigate the scalability of our architecture as routing tables sizes grow, and as key widths grow (e.g. IPv6). We then present the power dissipation of our architecture, followed by an evaluation of our update mechanism using real update traces. Finally, we compare our architecture against representative schemes from the trie and TCAM families of LPM solutions, in aspects such as power, storage size, latency and scalability.

Comparison Against EBF With No Wildcards

Recall that EBF comprises an on-chip Counting Bloom Filter and an off-chip hash table. Because hash-tables are usually sized based on the given number of keys n, regardless of their distribution, we do not use benchmarks for this evaluation but instead do a worst-case analysis for various values of n. Also, because EBF reduces the probability of collisions at the cost of larger tables, we expect that the total storage of EBF will be much larger than that of the present invention.

The actual storage space of EBF however, depends on the desired collision probability, therefore we plot two variants, EBF and poor-EBF with probabilities of collisions 1 in 2,000,000 and 1000, respectively. Of course a 1-in-1000 probability of collisions is not acceptable in a real design, but we plot poor-EBF to show that even when EBF is tuned for low storage at the cost of frequent collisions, the present invention's storage space is still smaller.

Figure 8:
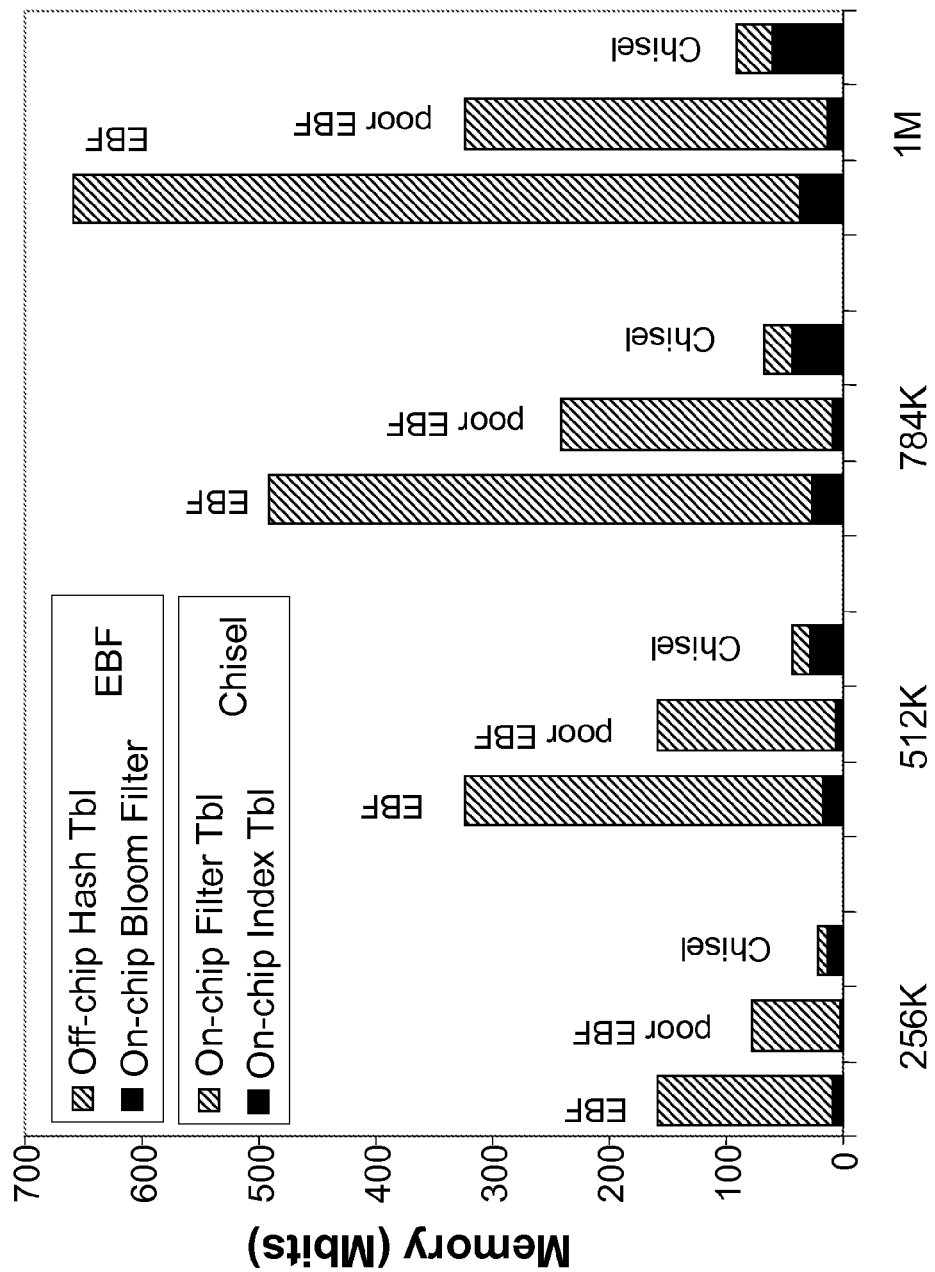
FIG. 8 is a bar graph showing the comparison of EBF storage verses storage for an architecture of the present invention for various table sizes, not considering wildcard bits.

FIG. 8 is a bar graph comparison of EBF storage verses present invention storage for various table sizes, not considering wildcard bits. FIG. 8 shows the worst-case storage sizes of EBF, poor-EBF and present invention for table sizes of 256K, 512K, 784K and 1 million keys. The bottom section of each bar corresponds to the first level of the data structure (on-chip counting bloom filter for EBF and on-chip Index table for present invention), whereas the top section corresponds to the second level (off-chip hash table for EBF and on-chip Filter Table for present invention).

We observe that the total storage space of the present invention is on average, 8-fold and 4-fold smaller than that of EBF and poor-EBF respectively. Note that the total storage of EBF is too large to possibly fit on chip, necessitating back and forth off-chip communication during lookups. In contrast, the total storage space of the present invention is small enough to fit the entirely on-chip (with technologies such as embedded DRAM), and in fact is only twice as large as just the on-chip storage requirement of EBF. Thus, the present invention is not only 4-fold more storage efficient, it is also avoids frequent off-chip communications making it fast and power efficient.

Prefix Collapsing vs. Prefix Expansion

In order to evaluate, in isolation, the benefits of prefix collapsing over CPE, we apply both approaches to the same hash-based scheme. Because bit-vector disambiguation in prefix collapsing requires collision-free hashing, prefix collapsing cannot be applied to EBF. Therefore we evaluate the present invention with prefix collapsing against the present invention with CPE.

Recall that for an l-fold reduction in the number of unique prefix lengths (i.e., stride=l), prefix collapsing incurs a worst-case overhead of $2^l$ bits per hash location; whereas CPE incurs a $2^{expansion\ length}$-fold increase in the number of prefixes. Consequently, CPE inflates the sizes of both the Index and Filter Tables in the present invention by as much as its expansion factor. In contrast, prefix collapsing does not affect the size of the Index and Filter Tables, but instead introduces a third table, the Bitvector Table, whose depth is the same as these tables. Hence, we expect that the storage space using prefix collapsing will be much smaller than that using CPE.

Figure 9:
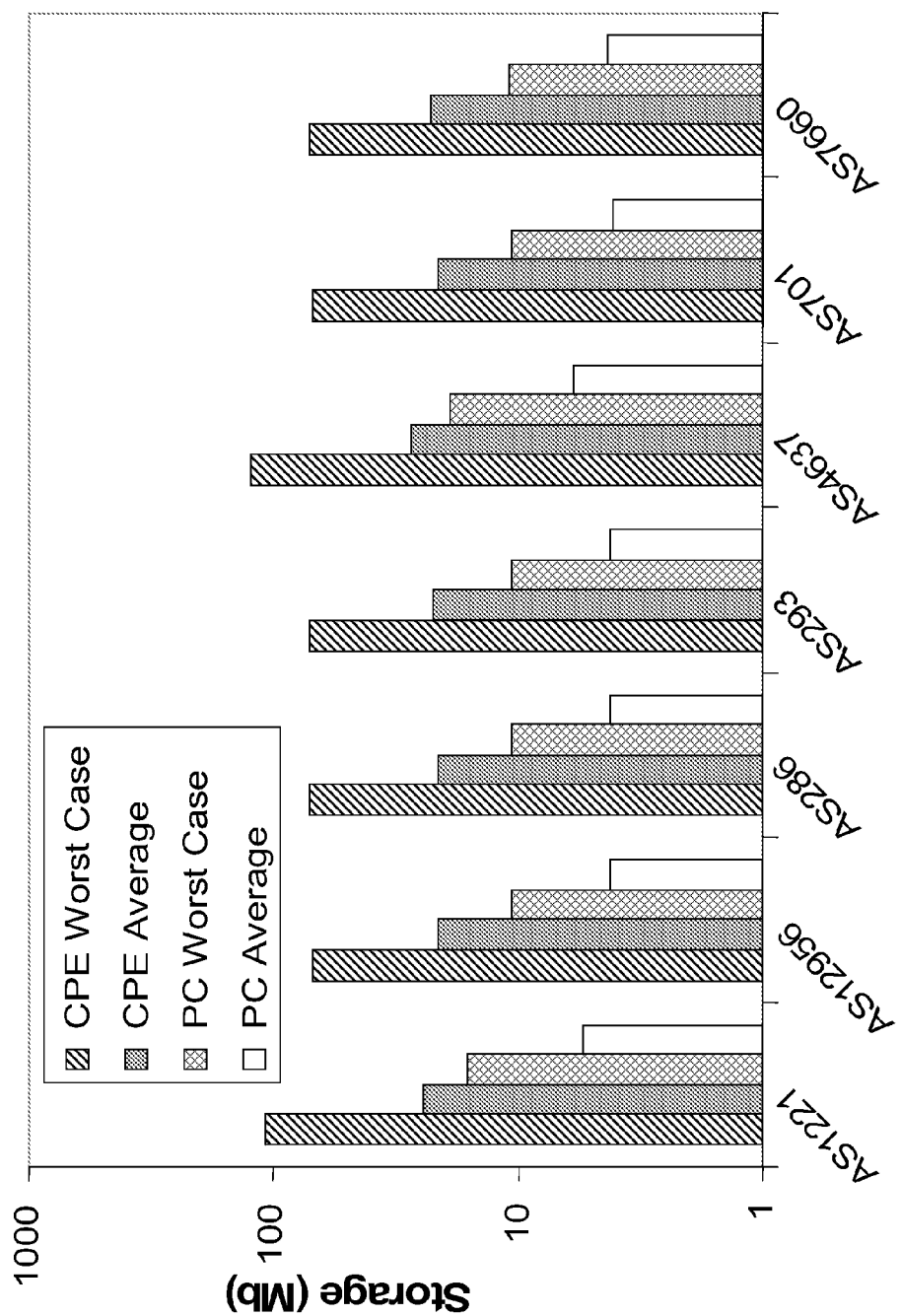
FIG. 9 is a bar graph showing the comparison of storage requirements of the present invention with CPE and PC for a stride of 4 and FIG. 10 is a bar graph showing worst-case storage space of the present invention versus average-case storage space of EBF+CPE.

In FIG. 9, there is shown both the worst-case and average-case storage space of the present invention using CPE and prefix collapsing (denoted as PC) for 7 different BGP tables, while using a stride of 4. Note that the y-axis has a logarithmic scale. We see that, although the average-case CPE storage is much smaller than its worst-case storage (the average CPE expansion factor was around 2.5 for these tables, whereas the worst is $2^{stride}=16$), the worst-case prefix-collapsing storage is still 33 to 50% better than the average-case CPE storage. Furthermore, the average-case prefix-collapsing storage is on average 5-fold smaller than the average-case CPE storage. We conclude that not only is prefix collapsing according to the present invention much more storage efficient than CPE, but it also enables deterministic sizing for routing tables due to its low worst-case storage requirements.

Chisel Versus EBF+CPE

We have already evaluated, in isolation, the benefits of the present invention over EBF, and of prefix collapsing over CPE. We now present an overall comparison of the complete Chisel architecture according to the present invention against EBF combined with CPE (referred to as EBF+CPE). Because our architecture of the present invention individually outperforms both EBF and CPE when evaluated in isolation, we expect that it will also outperform EBF+CPE.

Figure 10:
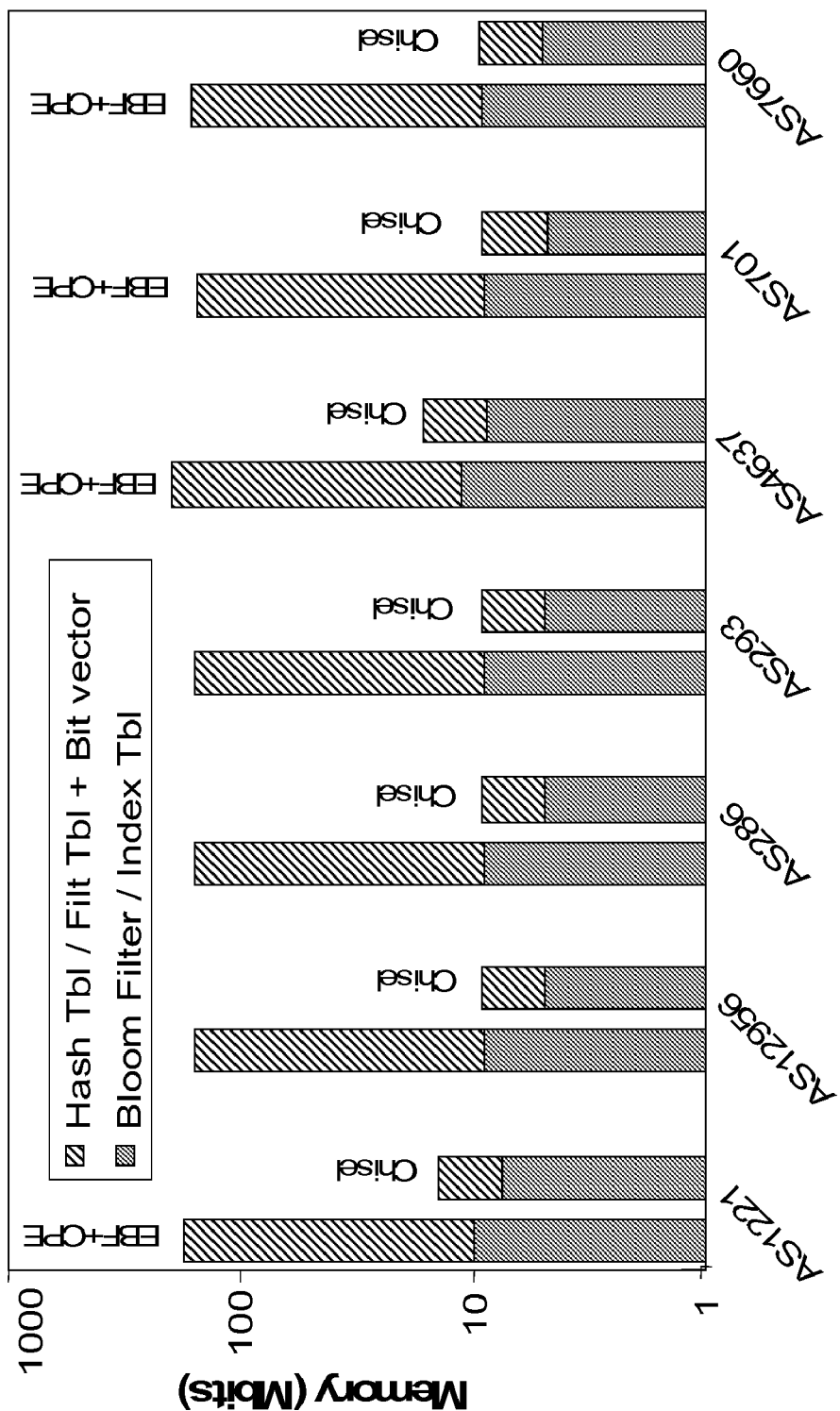

Turning our attention to FIG. 10, there we show the worst-case storage space of the present invention against the average-case storage of EBF+CPE, for 7 different BGP tables, while using a stride of 4. Note again, the y-axis has a logarithmic scale. We see that the worst-case total storage for the present invention is 12- to 17-fold smaller than the average-case total EBF+CPE storage. Furthermore the total storage for present invention is at most only 44% larger than just the on-chip storage required by EBF+CPE.

Scaling With Router Table Size

Figure 11:
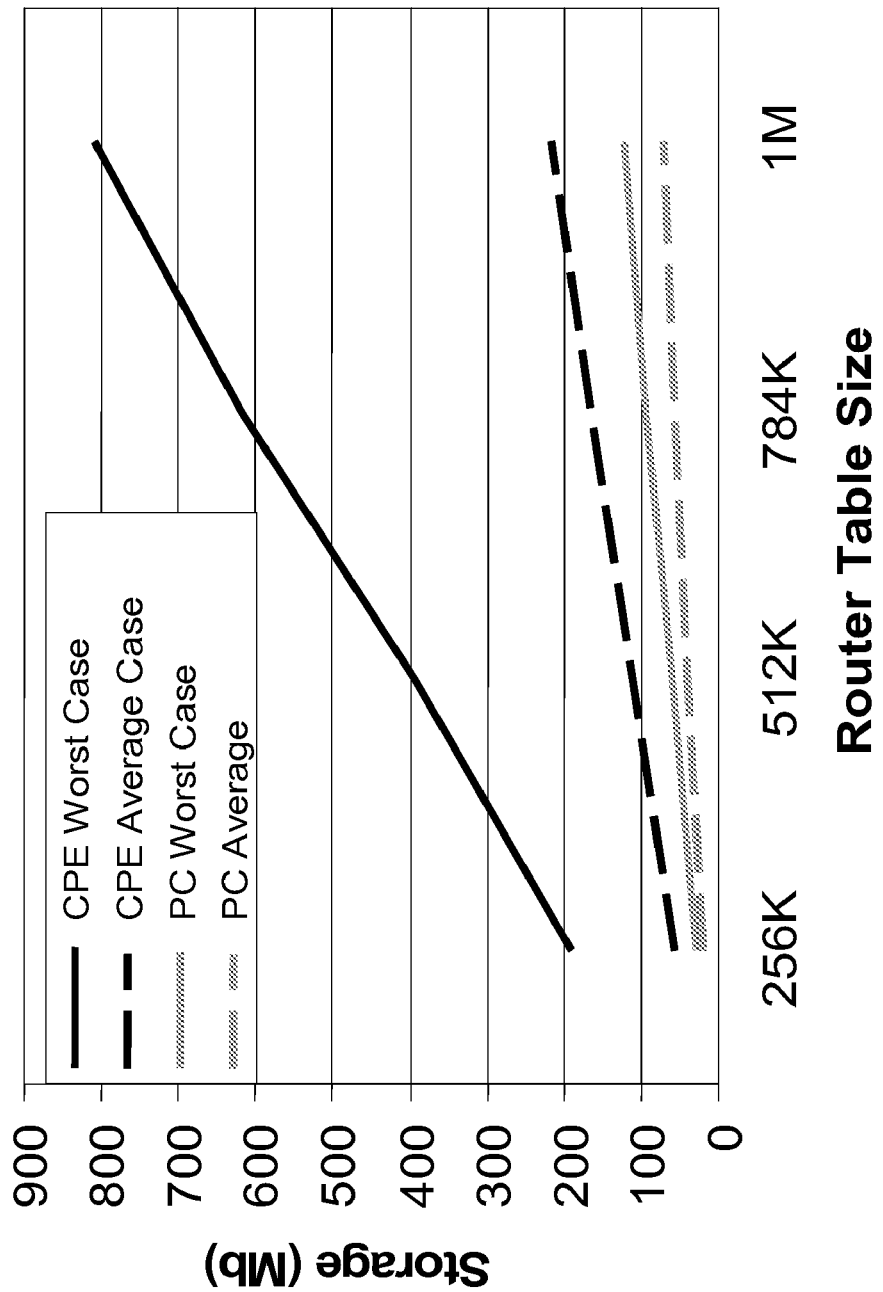
FIG. 11 is a graph comparing storage of the present invention with CPE and PC as a function of router table size.

Because real routing tables larger than 200K prefixes are hard to obtain, we synthesize large-table benchmarks using the prefix distributions from 7 real BGP 15 tables, and plot the average results over the 7 synthesized benchmarks. In FIG. 11, we show the theoretical worst-case and experimental average-case results using a stride of 4. We see that both the average-case and worst-case storage requirements of the present invention using prefix collapsing scale much better than those using CPE. The intuitive explanation is that the storage requirements of the Index, Filter and Bit-vector tables increase linearly with the number of entries. While CPE does not require Bit-vector tables, its constants of linearity are much higher (due to its high factor of expansion in total prefixes). Because the number of effective prefixes in worst-case CPE grows linearly with a higher constant due to its large expansion factor, its worst-case storage grows with a much steeper linear trend as well. Thus, we see that not only is prefix collapsing more storage efficient than CPE at smaller table sizes, it continues to be so at larger tables sizes.

Scaling With Key Width

Figure 12:
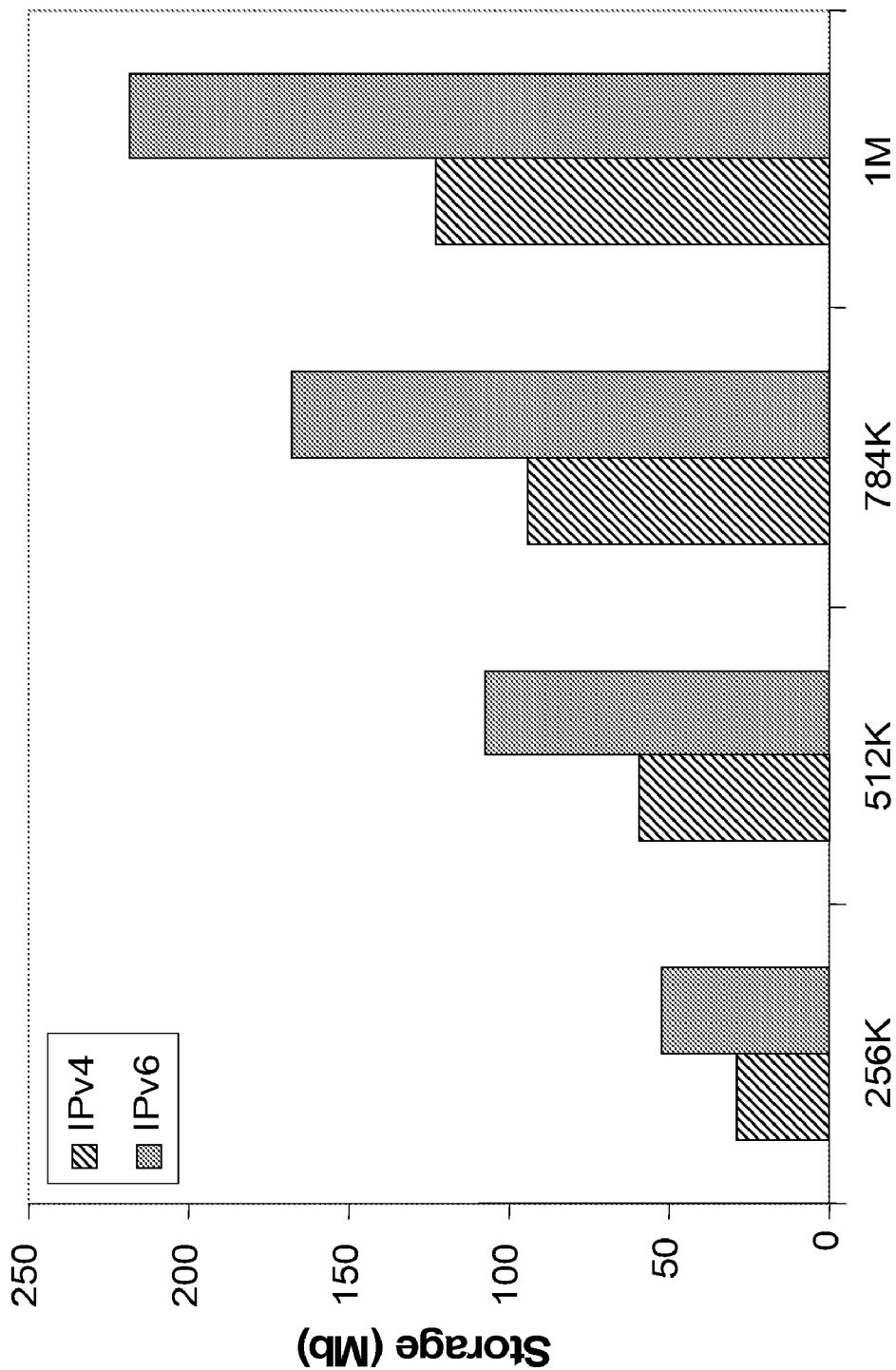
FIG. 12 is a graphical comparison of IPv4 and IPv6 storage space according to the present invention.

Scaling with key width is important considering a possible transition from IPv4 to IPv6. Because real IPv6 tables are hard to find, we synthesized IPv6 tables the using IPv4 tables as models. A larger key-width affects only the width of the Filter Table, as that is where the keys are stored. FIG. 12 shows the estimated increase in storage space when transitioning from IPv4 to IPv6. We see that, because only the Filter Table is affected by the wider keys, the worst-case storage requirements of the present invention merely double when the key-width is quadrupled. Furthermore, unlike trie-based schemes where the latency grows in proportion to the key-width, the lookup latency for the present invention remains practically unaffected as it simply hashes the wider keys.

Power Using Embedded DRAM

The memory organization of the present invention is such that few, relatively large blocks are required. The individual tables all have granularities of a few mega-bits, naturally matching typically available eDRAM granularities. Advantageously, we augmented the architectural simulator of the present invention with eDRAM models. The simulator reports the power consumed by the eDRAM and all the logic. We estimated the logic power by synthesizing the architecture of the present invention to gates using using an in-house simulator. We then used the library's gate-level power estimation models assuming a switching factor of 35%.

We expect the power dissipation of the present invention to scale well with increasing routing table sizes because for larger tables Chisel uses bigger eDRAM macros, which are more power-efficient than small ones. Because the architecture of the present invention is memory-intensive and has relatively simple logic, the logic power is around only 5-7% of the eDRAM power. With increasing table sizes, only the widths of the address buses are affected, hence we expect the logic power to increase only marginally.

Figure 13:
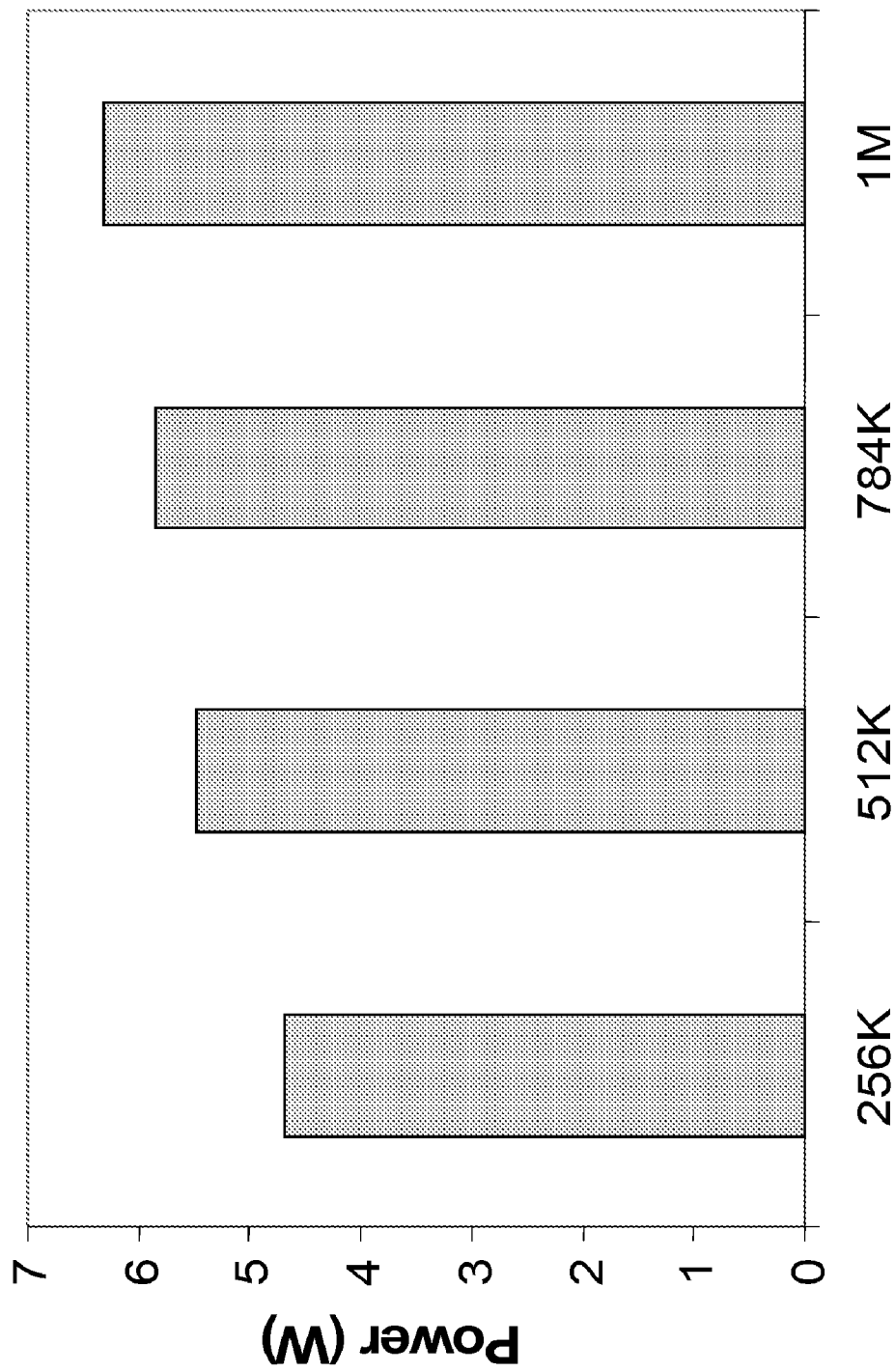
FIG. 13 is a graphical worst-case power estimate for a 200 Msps architecture according to the present invention implemented using embedded DRAM.

FIG. 13 shows the worst-case power estimates for various table sizes, obtained from our simulator. We see that power dissipation of the present invention when supporting 512K IPv4 prefixes and a lookup rate of 200 million searches per second (Msps) is about 5.5 W. By way of comparison, an equivalent TCAM (18 Mb) dissipates around 15 W of power at 100 Msps. At 200 Msps, it would be expected to dissipate 30 W of power (twice as much power), which is almost 5-fold higher than that of the present invention.

Updates

For the evaluation of our incremental update mechanisms according to the present invention, we obtained a set of real routing tables and their corresponding update traces. We chose update traces of routers from geographically diverse locations, and each trace contains 8 hours of real update traffic.

Figure 14:
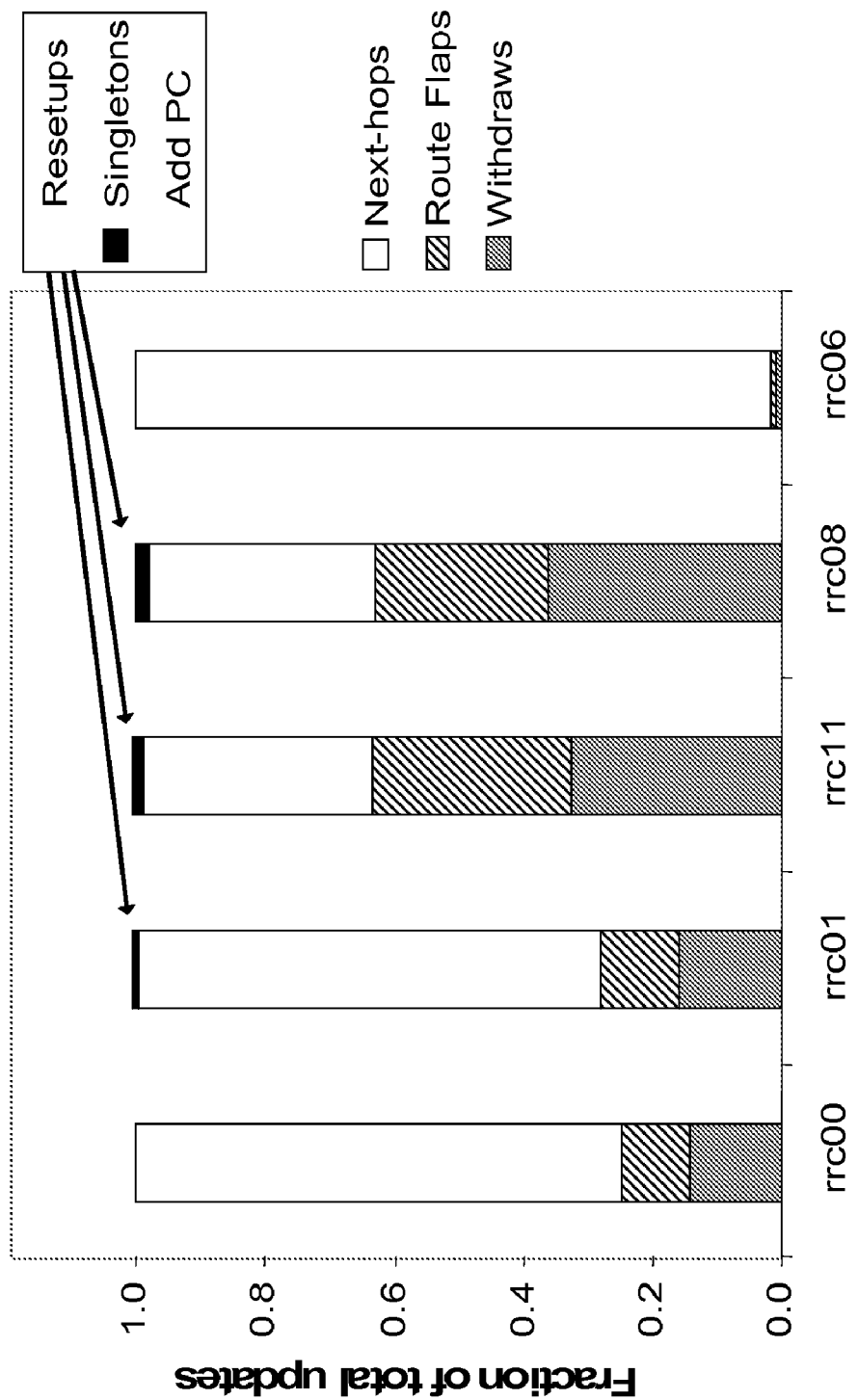
FIG. 14 is a graph showing the breakup of total update traffic.

In FIG. 14 we show the breakup of the total update traffic for various update traces. Withdraws is self-explanatory. Route Flaps are updates which add prefixes that were recently removed (either in the Index Table using the dirty-bit mechanism, or incrementally in the Bit-vector Table). Next-hops are route announcements for prefixes which are already present in the routing table, and only require changing the next-hop. Add PC are route announcements for prefixes which are not already present, but can be added without inserting a new key into the Index table, owing to the prefix collapsing effect as explained previously. Singletons refer to route announcements when a new key must be added to the Index Table and can be added incrementally as already explained. Resetups refer to cases where the Index table must be reconstructed.

As we can see from FIG. 14—and as a result of our heuristic update mechanisms and prefix collapsing—a very large fraction of all updates can be applied incrementally. Only a negligibly small fraction of updates actually require inserting a new key into the Index table. And even in such cases, the keys get inserted incrementally owing to the existence of a singleton location in their hash neighborhood. In all of the update traces we evaluate, the case for a resetup in the Index Table never arises. Recall that these traces represent 8 hours of real update traffic each. We ran these traces through our simulator of the present invention on a 3.0 GHz Pentium running Linux (Kernel build 2.6.9-1).

In Table 1, we show the update rates achieved by the architecture of the present invention for each of the traces. As can be seen, the present invention sustains an average of 276,000 updates per second across all traces. If the same update trace were processed by a typical network processor on a line-card, instead of a desktop Pentium 4, we could expect up to a 5-fold slowdown. Therefore, in a real implementation we would expect the present invention to sustain around 55,000 updates per second. Typical routers today process several thousand updates per second.

TABLE 1

Update rates sustained for various traces

| Routing table/update trace | Updates/sec |
|---|---|
| rrc00 (Amsterdam) | 268653.8 |
| rrc01 (LINX London) | 281427.5 |
| rrc11 (New York) | 282110.0 |
| rrc08 (San Jose) | 318285.7 |
| rrc06 (Otemachi, Japan) | 231595.8 |

Comparison With Other Families

We now compare the present invention against representatives from the two other families of lookup architectures: namely tries and TCAMs.

Chisel vs Tree Bitmap

Comparison With Other Families

Figure 15:
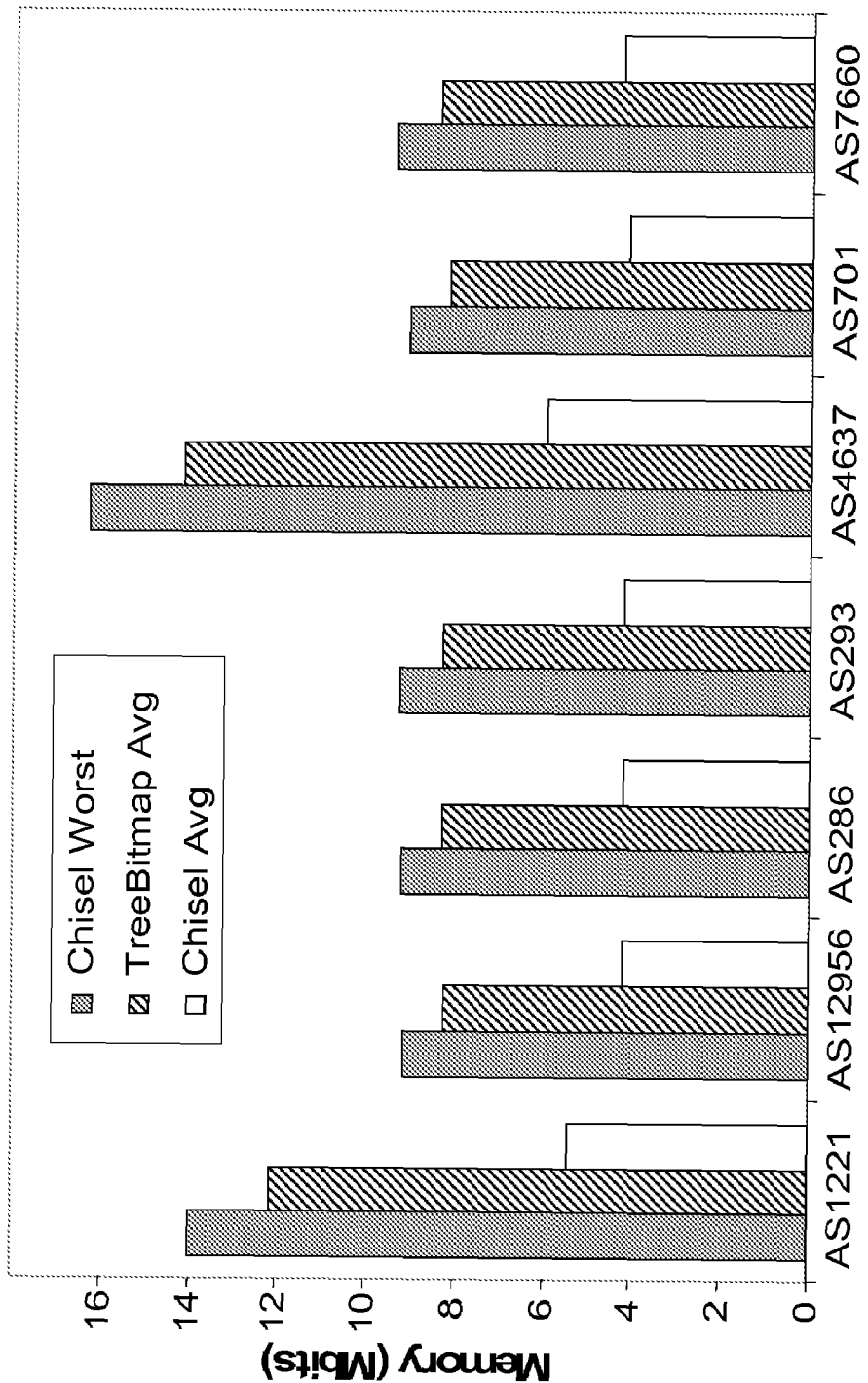
FIG. 15 is graphical comparison showing storage space of the present invention versus Tree Bitmap.

FIG. 15 show a comparison of the total storage space of the present invention versus that of Tree Bitmap. Since it is difficult to analyze and determine the worst-case storage for Tree Bitmap, we focus only on its average-case. The average-case storage for Tree Bitmap depends on the strides chosen at various levels and on the optimizations used. For the average-case storage space of Tree Bitmap, we assume the strides and the average-case bytes-per-prefix storage reported by David E. Taylor, Jonathan S. Turner, John Lockwood, Todd Sproull and David B. Parlour, in an article entitled "Scalable IP Lookup for Internet Routers," which appeared in *The IEEE Journal on Selected Areas in Communications*, 21-4, in May 2003. In comparing we plot both the worst-case and average-case storage for the present invention, and compare only against the average-case of Tree Bitmap.

As we can see from FIG. 15, the worst-case storage for the present invention is only 10% to 16% more than the average-case storage for Tree Bitmap. Further, the average-case storage for the present invention is about 44% smaller than that of Tree Bitmap, when averaged across all routing tables. Further, because the present invention can be fit entirely on-chip it does not require off-chip accesses. Staying on-chip for the lookup process leads to simpler design with small off-chip bandwidth and pins, saves power during operation, and results in higher performance.

In addition to storage space advantages, the latency of the present invention is key-width independent (except for an extra cycle introduced every 64 bits of key-width due to memory-access widths). In contrast, the latency of Tree Bitmap is proportional to the length of the prefixes. For IPv4, a storage-efficient Tree Bitmap requires 11 sequential off-chip memory accesses, whereas the present invention requires only 4. When moving to IPv6 the number of sequential memory accesses for the present invention remains the same (i.e., 4) whereas for Tree Bitmap it could grow 4-fold to about 40 sequential memory accesses. Recall that owing to high-line rates prevalent in LPM, longer latency leads to design complications such as, deeper pipelining, buffering on the front end of the router, and timing complexities for interoperability with other router components.

Chisel vs TCAMs

We now compare the present invention (Chisel) against TCAMs. One of the main drawbacks of TCAM is its huge power dissipation. In addition, because of the larger number of transistors required per bit implemented, TCAMs cannot be fabricated with the same density as SRAM or DRAM. All power estimates for TCAMs are extrapolated from the information that an 18 Mb TCAM dissipates around 15 W of power.

Figure 16:
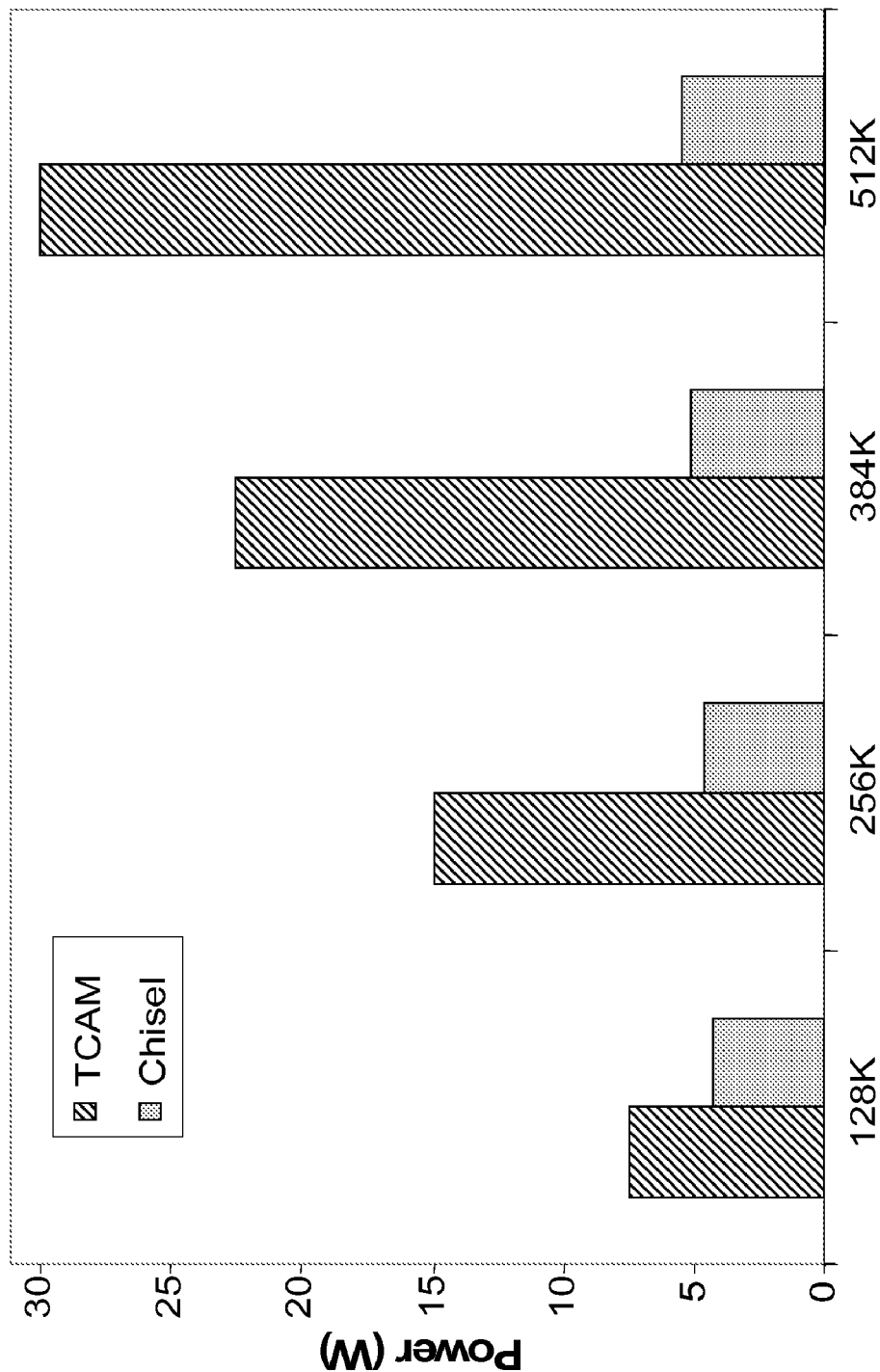
FIG. 16 is a graphical Comparison of the present invention and TCAM power dissipation.

FIG. 16 shows the power dissipation of the present invention versus TCAM for various routing table sizes assuming a lookup rate of 200 million searches per second (Msps). As we can see, the power dissipation of TCAMs grows rapidly with table sizes. In contrast the power dissipation of the present invention remains comparatively low. Smaller eDRAMs are less power efficient (watts-per-bit) than larger ones, therefore the power for small tables is high to start with, making the relative increase in power look small when moving to large tables. At the smallest table size, the power dissipation of the present invention is 43% less than that of TCAM, whereas at the largest table size it is almost 5-fold smaller than that of TCAM. Note that all power estimates in this graph are worst-case.

Hardware Prototype

We implemented an instance of the Chisel architecture according to the present invention on a Xilinx Virtex-IIPro XC2VP100 FPGA using an off-the-shelf PCI card. The card included the FPGA, 512 MB of DDR SDRAM and a PCI controller. The prototype supports up to 64K prefixes with 4 Chisel sub-cells. Each sub-cell has 3 hash functions, with the Index table implemented as a 3-way segmented memory. The Index Table segments (each 8 KW×14b), Filter Tables (each 16 KW×32b) and Bit-vector Tables (each 8 KW×30b) were all implemented using the FPGA's on-chip embedded SRAM blocks. A brief summary of the FPGA utilization is given in TABLE 2. Note that the logic and routing requirements are minimal, and the design is IO- and memory-intensive.

All elements of the Chisel hardware are emulated on the FPGA, while software functions such as the shadow copies of the data structures and setup algorithms are executed on the host processor. A clock speed of 100 MHz was achieved on the FPGA. With the free-ware DDR controllers we used, off-chip accesses incurred a delay of 8 cycles, resulting in a measured lookup speed of 12 MHz. Improving the DDR controllers can result in a lookup speed of 100 MHz, equal to the FPGA clock speed.

TABLE 2

Chisel Prototype FPGA Utilization

| Name | Used | Available | Utilization |
|---|---|---|---|
| Flip Flops | 14,138 | 88,192 | 16% |
| Occupied Slices | 10,680 | 44,096 | 24% |
| Total4-input LUTs | 10,746 | 88,192 | 12% |
| Bonded IOBs | 734 | 1,040 | 70% |
| Block RAMs | 292 | 444 | 65% |

At this point we have described the invention using specific examples and embodiments. In particular we have shown and described a storage-efficient collision-free hash based architecture and method for longest prefix matching. As can now be appreciated, hash-based approaches have attractive attributes such as low power, small storage space and latencies. Despite their attractiveness however, their practical deployment as LPM solutions are inhibited because hash tables incur collisions and the techniques employed to resolve them produce unpredictable lookup rates. Also, hash functions cannot operate on wildcard bits found in prefixes and the prior-art techniques used to implement same result in an unmanageably large number of hash tables or an explosion in the number of prefixes and storage space. Advantageously, the present invention overcomes these limitations of the prior art.

The description provided has—for the sake of simplicity—centered on network processing applications and in particular those typically found in network routers. More specifically, we have described the present invention as applied to storage and retrieval problems employing LPM methodologies. Advantageously, the present invention is not so limited and those skilled in the art will recognize that the present invention may be applied to any hash based information storage and retrieval application which would benefit from its attributes. In particular, storage and retrieval applications requiring efficiency, speed and deterministic attributes would benefit from the present invention and its application thereto. Accordingly, the present invention should be limited only by the scope of the claims attached hereto.

What is claimed is:

1. A method of operating upon a data structure used for storing and retrieving data items wherein said data structure includes an index table, a bitmap table and a result table, said method comprising the computer implemented steps of:

storing within the index table, an encoded value for each data item, wherein said encoded value is stored at an index obtained by hashing the data item according to the following relationship $$V(t) = D[H_{h_{\tau(t)}}(t)] = \left( \bigwedge_{\substack{i=1 \\ i!=h_\tau(t)}}^{i=k} D[H_i(t)] \right) \wedge p(t)$$

where "$\wedge$" represents the XOR operation, $H_i(t)$ is the i'th hash value of t, $D[H_i(t)]$ is the data value in the $H_i(t)$'th location of the Index Table, $h_\tau(t)$ identifies which hash function produces $\tau(t)$, and k is the total number of hash functions and where p(t) is a pointer into the bitmap table;

combining the values contained within the index table addressed by the hash results;

storing within the bitmap table, a bitmap and a pointer at the index pointed to by the index table where said bitmap represents wildcards in a prefix of the data item and the pointer indexes a region in the result table; and storing within the result table, output data associated with each data item, said output data being stored at an address determined by the bitmap and the pointer.

* * * * *